United States Patent
Zhang et al.

(10) Patent No.: US 12,486,321 B2
(45) Date of Patent: Dec. 2, 2025

(54) AGENTS THAT INTERFERE WITH IL-1BETA RECEPTOR SIGNALLING

(71) Applicant: Tavotek Biotechnology (Jiangsu) Co., Ltd, Suzhou (CN)

(72) Inventors: Di Zhang, Hillsborough, NJ (US); Susan Tam, Garnet Valley, PA (US); Minseon Cho, Breinigsville, PA (US); Lihua Shi, Wynnewood, PA (US); Man-Cheong Fung, Ringoes, NJ (US)

(73) Assignee: Tavotek Biotechnology (Jiangsu) Co., Ltd, Suzhou (CN)

( * ) Notice: Subject to any disclaimer, the term of this patent is extended or adjusted under 35 U.S.C. 154(b) by 729 days.

(21) Appl. No.: 17/759,154

(22) PCT Filed: Jul. 9, 2020

(86) PCT No.: PCT/US2020/041303
§ 371 (c)(1),
(2) Date: Jul. 20, 2022

(87) PCT Pub. No.: WO2021/150266
PCT Pub. Date: Jul. 29, 2021

(65) Prior Publication Data
US 2023/0068783 A1    Mar. 2, 2023

Related U.S. Application Data

(60) Provisional application No. 62/963,654, filed on Jan. 21, 2020.

(51) Int. Cl.
*C07K 16/24* (2006.01)
*A61P 19/02* (2006.01)

(52) U.S. Cl.
CPC ............ *C07K 16/245* (2013.01); *A61P 19/02* (2018.01); *C07K 2317/52* (2013.01)

(58) Field of Classification Search
CPC .................................................. C07K 16/245
See application file for complete search history.

(56) References Cited

U.S. PATENT DOCUMENTS

| 2002/0146753 | A1 | 10/2002 | Ditzel et al. |
| 2005/0032175 | A1 | 2/2005 | Stahl et al. |
| 2008/0044414 | A1 | 2/2008 | Masat et al. |
| 2009/0028851 | A1 | 1/2009 | Stuhmer et al. |
| 2009/0304693 | A1 | 12/2009 | Ghayur et al. |
| 2011/0150903 | A1 | 6/2011 | Baurin et al. |
| 2012/0288507 | A1 | 11/2012 | Qian et al. |
| 2013/0224187 | A1 | 8/2013 | Sheridan et al. |
| 2016/0031990 | A1 | 2/2016 | Steele et al. |
| 2019/0177425 | A1 | 6/2019 | Levy et al. |
| 2021/0009674 | A1 | 1/2021 | Zhang et al. |

FOREIGN PATENT DOCUMENTS

| JP | 2004-506448 A | 3/2004 |
| JP | 2008-543340 A | 12/2008 |
| WO | WO 02/16436 A2 | 2/2002 |
| WO | 2007/002261 A2 | 1/2007 |
| WO | 2008/145664 A1 | 12/2008 |
| WO | 2021/007439 A1 | 1/2021 |

OTHER PUBLICATIONS

Dondelinger et al., "Understanding the Significance and Implications of Antibody Numbering and Antigen-Binding Surface/Residue Definition," Frontiers in Immunology, 9:2278 (2018).
Blech, Michaela et al: "One Target-Two Different Binding Modes: Structural Insights into Gevokizumab and Canakinumab Interactions to Interleukin-I[beta]", Journal of Molecular Biology, vol. 425, No. 1, Jan. 1, 2013 (Jan. 1, 2013), pp. 94-111, United Kingdom ISSN: 0022-2836, DOI: 10.1016/j.jmb.2012.09.021.
Brezski, Randall J et al: "Application of antibody engineering in the development of next generation antibody-based therapeutics", Jan. 1, 2012 (Jan. 1, 2012), Development of Antibody-Based Therapeutics :Translational Considerations, Springer, USA, pp. 65-93, ISBN: 978-1-4419-5953-9.
Goulet, Dennis R. et al: "Kinetic mechanism of controlled Fab-arm exchange for the formation of bispecific immunoglobulin GI antibodies", Journal of Biological Chemistry, vol. 293, No. 2, Nov. 17, 2017 (Nov. 17, 2017), 651-661, US ISSN: 0021-9258, DOI: 10.1074/jbc.RA117.000303.
UnitProtKB Accession No. A0A2E1MHQ3 Pkd Domain-Containing Protein (Jan. 31, 2018), https://www.uniprot.org/uniprot/A0A2E1MHQ3 (retrieved Feb. 1, 2021).
UnitProtKB Accession No. A0A430B4G8 NodB Homology Domain-Containing Protein (May 8, 2019), https://www.uniprot.org/uniprot/A0A430B4G8 (retrieved Feb. 1, 2021).
International Search Report for PCT/US2020/041303, mailed Mar. 1, 2021.

*Primary Examiner* — Prema M Mertz
(74) *Attorney, Agent, or Firm* — Finnegan, Henderson, Farabow, Garrett & Dunner, LLP

(57) ABSTRACT

The present disclosure relates to antibodies that specifically bind and neutralize interleukin-1β (IL-1β), and to the use of such antibodies for the therapeutic treatment of IL-1β-mediated diseases and disorders.

19 Claims, 8 Drawing Sheets
Specification includes a Sequence Listing.

FIGURE 3
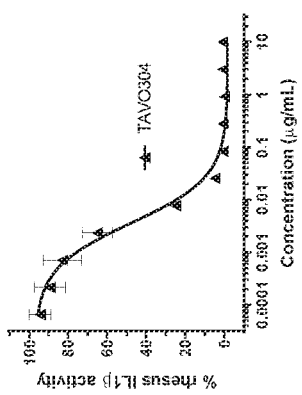
FIGURE 3A
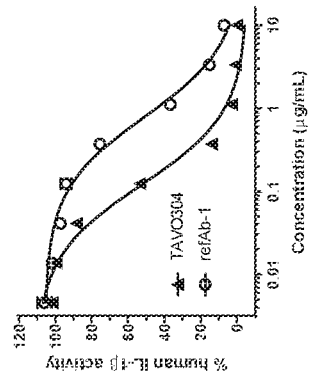
FIGURE 3B

FIGURE 7
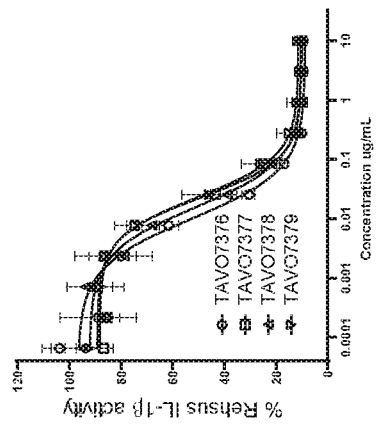
FIGURE 7A
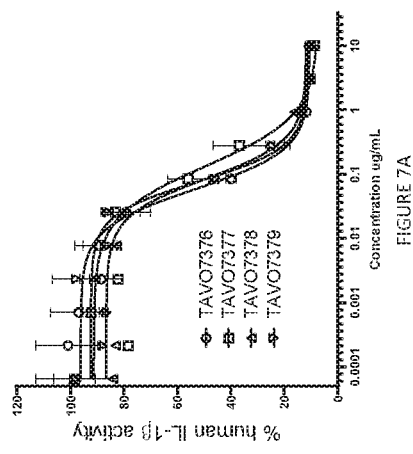
FIGURE 7B

AGENTS THAT INTERFERE WITH IL-1BETA RECEPTOR SIGNALLING

PRIORITY

This application is a national stage application of International Application No. PCT/US2020/014303, filed Jul. 9, 2020, which claims priority to U.S. Provisional Application No. 62/963,654, filed Jan. 21, 2020, the entire contents of each content of which are incorporated herein by reference.

SEQUENCE LISTING

The instant application contains a Sequence Listing which has been submitted electronically in ASCII format and is hereby incorporated by reference in its entirety. Said ASCII copy, created on on Sep. 12, 2024, is named 15271 0001 00000 Replacement SL.txt and is 54,341 bytes in size.

BACKGROUND

Human interleukin 1β (IL-1β) is a pro-inflammatory cytokine that acts as an mediator of the peripheral immune response during infection and inflammation. IL-1β is initially synthesized in the form of a precursor peptide (pro-IL-1β), which is cleaved in the inflammasome complex by caspase-1, and secreted into the extracellular space. IL-1β can be released by various cell types.

There are two IL-1 receptors, IL-1RI and IL-1RII. IL-1β exerts its action on target cells through the receptor IL-1RI. Dysregulated IL-1β activity is characteristic of autoimmune diseases and may occur due to either abnormally increased levels of the cytokine, or qualitative or quantitative deficiency of IL-1RI endogenous antagonist. IL-1β is specifically implicated in several auto-inflammatory diseases.

Canakinumab (Ilaris, ACZ885), developed by Novartis, is a human monoclonal antibody targeting interleukin-1l. The mode of action of Canakinumab is based on the neutralization of IL-1β signalling (Alten, Gram et al. 2008). Canakinumab was approved for the treatment of cryopyrin-associated periodic syndromes (CAPS) in 2009, and was subsequently approved in 2016 on three additional rare and serious auto-inflammatory diseases (Gram 2016).

Gevokizumab (XOMA052), developed by XOMA, is another monoclonal antibody targeting IL-1β. Gevokizumab is claimed to be a regulatory therapeutic antibody that modulates IL-1β bioactivity by reducing the affinity for its IL-1RI:IL-1RAcP signalling complex (Owyang, Issafras et al. 2011) (Issafras, Corbin et al. 2013).

In recent years, IL-1β has been found to be associated with several steps in the development of atherosclerotic plaques, as well as other cardiovascular disease modifiers (McCarty and Frishman 2014). The hypothesis is that these inflammatory chemicals may prevent the heart from healing from damage by previous heart attacks. In 2017, a phase III clinical trial with Canakinumab revealed a 15% reduction in deaths from heart attacks, stroke and cardiovascular disease combined. The trial also revealed a significant reduction in lung cancer incidence and mortality.

Considering the efficacy of anti-IL-1β antibodies in auto-inflammatory diseases, heart attacks and lung cancer, there is a need for the development of additional anti-IL-1β antibodies with improved efficacies and pharmacokinetic profiles.

SUMMARY

The disclosure provides for monoclonal antibodies and antigen-binding fragments thereof that specifically bind and neutralize, inhibit, block, abrogate, reduce, or interfere with, at least one activity of IL-1β. The activity of IL-1β that can be neutralized, inhibited, blocked, abrogated, reduced or interfered with, by the antibodies or fragments thereof as disclosed herein, includes, but is not limited by, neutralization of IL-1β activation of its receptor IL-1RI, and the like.

The disclosure provides for a mouse monoclonal antibody to human IL-1β, designated as TAVO304, comprising a heavy chain variable region sequence with amino acid sequence of SEQ ID NO. 1, and a light chain variable region sequence with amino acid sequence of SEQ ID NO. 2.

The disclosure provides for the heavy chain variable region of TAVO304 comprising three Complementarity Determining Regions (CDRs), designated as HCDR1, HCDR2 and HCDR3, with amino acid sequence set forth as SEQ ID NO. 3, SEQ ID NO. 4 and SEQ ID NO. 5, respectively.

The disclosure provides for the light chain variable region of TAVO304 comprising three CDRs, designated as LCDR1, LCDR2 and LCDR3, with amino acid sequence set forth as SEQ ID NO. 6, SEQ ID NO. 7 and SEQ ID NO. 8, respectively.

The disclosure provides for one humanized heavy chain variable region of TAVO304, designated as 304VH1, with amino acid sequence set forth as SEQ ID NO. 9.

The disclosure provides for four humanized light chain variable region of TAVO304, designated as 304VL1, 304VL2, 304VL3 and 304VL4, with amino acid sequences set forth as SEQ ID NO. 10, SEQ ID NO. 11, SEQ ID NO. 12, and SEQ ID NO. 13, respectively.

The disclosure provides for a first humanized antibody for TAVO304 comprising humanized heavy chain variable region 304VH1 and humanized light chain variable region 304VL1, designated as TAVO7376, comprising heavy chain sequence set forth as SEQ ID NO. 14 and light chain sequence set forth as SEQ ID NO. 15.

The disclosure provides for a second humanized antibody for TAVO304 comprising humanized heavy chain variable region 304VH1 and humanized light chain variable region 304VL2, designated as TAVO7377, comprising heavy chain sequence set forth as SEQ ID NO. 14 and light chain sequence set forth as SEQ ID NO. 16.

The disclosure provides for a third humanized antibody for TAVO304 comprising humanized heavy chain variable region 304VH1 and humanized light chain variable region 304VL3, designated as TAVO7378, comprising heavy chain sequence set forth as SEQ ID NO. 14 and light chain sequence set forth as SEQ ID NO. 17.

The disclosure provides for a fourth humanized antibody for TAVO304 comprising humanized heavy chain variable region 304VH1 and humanized light chain variable region 304VL4, designated as TAVO7379, comprising heavy chain sequence set forth as SEQ ID NO. 14 and light chain sequence set forth as SEQ ID NO. 18.

The antibodies as disclosed herein can be full length IgG1, IgG2, IgG3, IgG4 antibodies or may comprise only an antigen-binding portion including a Fab, F(ab')2, or scFv fragment. The antibody backbones may be modified to affect functionality, e.g., to eliminate residual effector functions.

The disclosure also provides for an isolated engineered anti-IL-1β IgG antibody with an extended half-life when compared to the parental wild-type antibody. The extension of half-life can be realized by engineering the $C_{H2}$ and $C_{H3}$ domains of the antibody with any one set of mutations selected from M252Y/S254T/T256E, M428L/N434S, T250Q/M428L, N434A and T307A/E380A/N434A when compared to a parental wild-type antibody, residue numbering according to the EU Index.

The disclosure also provides for an isolated engineered anti-IL-1β IgG antibody with enhanced resistant to proteolytic degradation by a protease that cleaves the wild-type antibody between or at residues 222-237 (EU numbering). The resistance to proteolytic degradation can be realized by engineering E233P/L234V/L235A mutations in the hinge region with G236 deleted when compared to a parental wild-type antibody, residue numbering according to the EU Index.

The disclosure also provides for a polynucleotide comprising the polynucleotide sequence encoding the polypeptide sequence of anti-IL-1β monoclonal antibodies and antigen-binding fragments as disclosed herein.

The disclosure also provides for a vector comprising the polynucleotide as disclosed herein.

The disclosure also provides for a host cell comprising the vector as disclosed herein.

The disclosure also provides for a method of producing an anti-IL-1β monoclonal antibody as disclosed herein, comprising culturing the host cell as disclosed herein under conditions that the antibody is expressed, and purifying the antibody.

The disclosure also provides for a pharmaceutical composition comprising an anti-IL-1β monoclonal antibody as disclosed herein and a pharmaceutically acceptable carrier.

The disclosure also provides for methods of detecting the binding of the anti-IL-1β monoclonal antibodies to IL-1β.

The disclosure also provides for methods of blocking the binding of IL-1β to its receptor IL-1RI by the anti-IL-1β monoclonal antibodies to IL-1β.

The disclosure also provides for methods of neutralizing the functional activity of IL-1β to its receptor IL-1RI by the anti-IL-1β monoclonal antibodies to IL-1β.

The disclosure also provides for methods of measuring the half-life of the engineered anti-IL-1β monoclonal antibodies.

The disclosure also provides for methods of measuring the resistance to proteolytic degradation of the engineered anti-IL-1β monoclonal antibodies.

The disclosure also provides for a method of treating anti-inflammatory diseases in a subject, comprising administering a therapeutically effective amount of an anti-IL-1β monoclonal antibody.

The disclosure also provides for a method of treating cardiovascular diseases in a subject, comprising administering a therapeutically effective amount of an anti-IL-1β monoclonal antibody.

The disclosure also provides for a method of treating lung cancer in a subject, comprising administering a therapeutically effective amount of an anti-IL-13 monoclonal antibody.

Any one embodiment of the disclosure described herein, including those described only in one section of the specification describing a specific aspect of the disclosure, and those described only in the examples or drawings, can be combined with any other one or more embodiment(s), unless explicitly disclaimed or improper.

BRIEF DESCRIPTION OF THE DRAWINGS

FIG. 3: Neutralizing (A) human or (B) rhesus monkey IL-1β driven reporter gene activation by TAVO304 or a reference antibody refAb-1 (Canakinumab) in HEK-Blue reporter assays.

FIG. 4 discloses SEQ ID NOS 2, 10-13, 1, and 9, respectively, in order of appearance.

FIG. 7: Neutralizing (A) human and (B) rhesus monkey IL-1β driven reporter gene activation by four humanized anti-IL-1β IgG1 antibodies in HEK-Blue reporter assays.

DETAILED DESCRIPTION OF THE DISCLOSURE

Definitions

Figure 1:
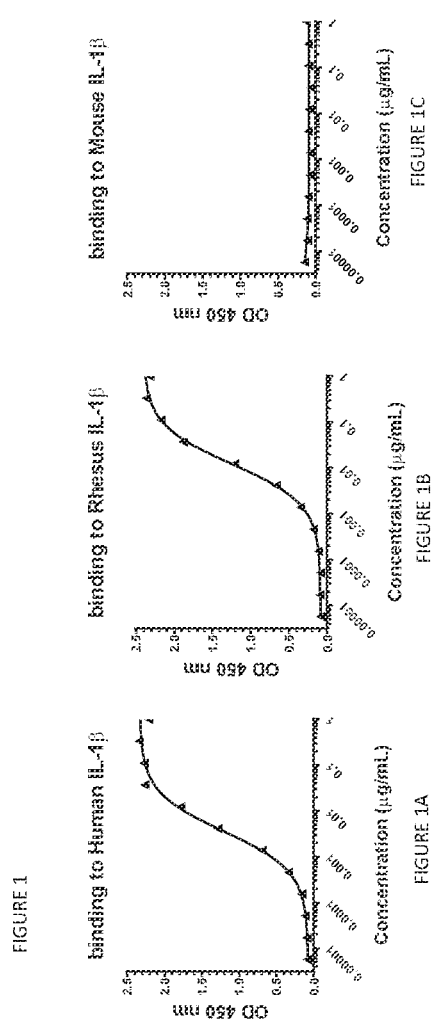
FIG. 1: Binding to (A) human, (B) rhesus monkey and (C) mouse IL-1β by mouse monoclonal anti-human IL-1β antibody TAVO304.

All publications, including but not limited to patents and patent applications, cited in this specification are herein incorporated by reference as though fully set forth.

It is to be understood that the terminology used herein is for the purpose of describing particular embodiments only and is not intended to be limiting. Unless defined otherwise, all technical and scientific terms used herein have the same meaning as commonly understood by one of ordinary skill in the art to which the disclosure pertains.

Although any methods and materials similar or equivalent to those described herein may be used in the practice relating to the present disclosure, exemplary materials and methods are described herein.

As used in this specification and the appended claims, the singular forms "a," "an," and "the" include plural referents unless the content clearly dictates otherwise. Thus, for example, reference to "a cell" includes a combination of two or more cells, and the like.

"Antibodies" is meant in a broad sense and includes immunoglobulin molecules including monoclonal antibodies including murine, human, humanized and chimeric monoclonal antibodies, antibody fragments, bispecific or multi-specific antibodies, dimeric, tetrameric or multimeric antibodies, single chain antibodies, domain antibodies and any other modified configuration of the immunoglobulin molecule that comprises an antigen binding site of the required specificity.

"Full length antibody molecules" are comprised of two heavy chains (HC) and two light chains (LC) inter-connected by disulfide bonds as well as multimers thereof (e.g., IgM). Each heavy chain is comprised of a heavy chain variable region (VH) and a heavy chain constant region (comprised of domains CH1, hinge, CH2 and CH3). Each light chain is comprised of a light chain variable region (VL) and a light chain constant region (CL). The VH and the VL regions may be further subdivided into regions of hyper variability, termed complementarity determining regions (CDR), interspersed with framework regions (FR). Each VH and VL is respectively composed of three CDRs and four FR segments, arranged from amino-to-carboxyl-terminus in the following order: FR1, CDR1, FR2, CDR2, FR3, CDR3 and FR4.

"Complementarity determining regions (CDR)" are "antigen binding sites" in an antibody. CDRs may be defined using various terms: (i) Complementarity Determining Regions (CDRs), three in the VH (HCDR1, HCDR2, HCDR3) and three in the VL (LCDR1, LCDR2, LCDR3) are based on sequence variability (Wu et al. (1970) J Exp Med 132: 211-50 (Kabat et al., Sequences of Proteins of Immunological Interest, 5th Ed. Public Health Service, National Institutes of Health, Bethesda, Md., 1991). (ii) "Hypervariable regions," "HVR," or "HV," three in the VH (H1, H2, H3) and three in the VL (L1, L2, L3) refer to the regions of an antibody variable domains which are hypervariable in structure as defined by Chothia and Lesk (Chothia et al. (1987) J Mol Biol 196: 901-17. The International ImMunoGeneTics (IMGT) database (http://www_imgt_org) provides a standardized numbering and definition of antigen-binding sites. The correspondence between CDRs, HVs and IMGT delineations is described in (Lefranc et al. (2003) Dev Comp Immunol 27: 55-77. The term "CDR," "HCDR1," "HCDR2," "HCDR3," "LCDR1," "LCDR2" and "LCDR3" as used herein includes CDRs defined by any of the methods described supra, Kabat, Chothia or IMGT, unless otherwise explicitly stated in the specification.

Immunoglobulins may be assigned to five major classes, IgA, IgD, IgE, IgG and IgM, depending on the heavy chain constant region amino acid sequence. IgA and IgG are further sub-classified as the isotypes IgA1, IgA2, IgG1, IgG2, IgG3 and IgG4. Antibody light chains of any vertebrate species may be assigned to one of two types, namely kappa (κ) and lambda (λ), based on the amino acid sequences of their constant regions.

"Antibody fragments" refers to a portion of an immunoglobulin molecule that retains a heavy chain and/or the light chain antigen binding site, such as heavy chain complementarity determining regions (HCDR) 1, 2 and 3, light chain complementarity determining regions (LCDR) 1, 2 and 3, a heavy chain variable region (VH), or a light chain variable region (VL). Antibody fragments include Fab, F(ab')2, Fd and Fv fragments as well as domain antibodies (dAb), e.g., consisting of one VH domain. VH and VL domains may be linked together via a synthetic linker to form various types of single chain antibody designs where the VH/VL domains may pair intramolecularly, or intermolecularly in those cases when the VH and VL domains are expressed by separate single chain antibody constructs, to form a monovalent antigen binding site, such as single chain Fv (scFv) or diabody; described for example in Int. Patent Publ. Nos. WO1998/44001, WO1988/01649, WO1994/13804 and WO1992/01047.

"Monoclonal antibody" refers to an antibody population with single amino acid composition in each heavy and each light chain, except for possible well known alterations such as removal of C-terminal lysine from the antibody heavy chain. Monoclonal antibodies typically bind one antigenic epitope, except that bispecific monoclonal antibodies bind two distinct antigenic epitopes. Monoclonal antibodies may have heterogeneous glycosylation within the antibody population. Monoclonal antibody may be monospecific or multi-specific, or monovalent, bivalent or multivalent. A bispecific antibody is included in the term monoclonal antibody.

"Isolated antibody" refers to an antibody or antibody fragment that is substantially free of other antibodies having different antigenic specificities. "Isolated antibody" encompasses antibodies that are isolated to a sufficient purity, such as antibodies that are 80%, 81%, 82%, 83%, 84%, 85%, 86%, 87%, 88%, 89%, 90%, 91%, 92%, 93%, 94%, 95%, 96%, 97%, 98%, 99% or 100% pure.

"Humanized antibody" refers to an antibody in which the antigen binding sites are derived from non-human species and the variable region frameworks are derived from human immunoglobulin sequences. Humanized antibody may include substitutions in the framework so that the framework may not be an exact copy of expressed human immunoglobulin or human immunoglobulin germline gene sequences.

"Human antibody" refers to an antibody having heavy and light chain variable regions in which both the framework and the antigen binding site are derived from sequences of human origin and is optimized to have minimal immune response when administered to a human subject. If the antibody contains a constant region or a portion of the constant region, the constant region also is derived from sequences of human origin.

The numbering of amino acid residues in the antibody constant region throughout the specification is according to the EU index as described in Kabat et al., Sequences of Proteins of Immunological Interest, 5th Ed. Public Health Service, National Institutes of Health, Bethesda, MD (1991), unless otherwise explicitly stated.

Conventional one and three-letter amino acid codes are used herein as shown in Table 1.

TABLE 1

| Amino acid | Three-letter code | One-letter code |
| --- | --- | --- |
| Alanine | Ala | A |
| Arginine | Arg | R |
| Asparagine | Asn | N |
| Aspartate | Asp | D |
| Cysteine | Cys | C |
| Glutamate | Gln | E |
| Glutamine | Glu | Q |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |

The constant region sequences of the mammalian IgG heavy chain are designated in sequence as CH1-hinge-$C_{H2}$-$C_{H3}$. The "hinge," "hinge region" or "hinge domain" of an IgG is generally defined as including Glu216 and terminating at Pro230 of human $IgG_1$ according to the EU Index but functionally, the flexible portion of the chain may be considered to include additional residues termed the upper and lower hinge regions, such as from Glu216 to Gly237 and the lower hinge has been referred to as residues 233 to 239 of the $F_c$ region where $F_c\gamma R$ binding was generally attributed. The hinge regions of other IgG isotypes may be aligned with the IgG$_1$ sequence by placing the first and last cysteine residues forming inter-heavy chain S—S bonds. Although boundaries may vary slightly, as numbered according to the EU Index, the C$_{H1}$ domain is adjacent to the V$_H$ domain and amino terminal to the hinge region of an immunoglobulin heavy chain molecule and includes the first (most amino terminal) constant region of an immunoglobulin heavy chain, e.g., from about EU positions 118-215. The F$_c$ domain extends from amino acid 231 to amino acid 447; the C$_{H2}$ domain is from about Ala231 to Lys340 or Gly341 and the C$_{H3}$ from about Gly341 or Gln342 to Lys447. The residues of the IgG heavy chain constant region of the C$_{H1}$ region terminate at Lys. The F$_c$ domain containing molecule comprises at least the C$_{H2}$ and the C$_{H3}$ domains of an antibody constant region, and therefore comprises at least a region from about Ala231 to Lys447 of IgG heavy chain constant region. An F$_c$ domain containing molecule may optionally comprise at least a portion of the hinge region.

"Epitope" refers to a portion of an antigen to which an antibody specifically binds. Epitopes typically consist of active (such as polar, non-polar or hydrophobic) surface groupings of moieties such as amino acids or polysaccharide side chains and may have specific three-dimensional structural characteristics, as well as specific charge characteristics. An epitope may be composed of contiguous and/or discontiguous amino acids that form a conformational spatial unit. For a discontiguous epitope, amino acids from differing portions of the linear sequence of the antigen come in close proximity in 3-dimensional space through the folding of the antigen molecule. Antibody "epitope" depends on the methodology used to identify the epitope.

A "leader sequence" as used herein includes any signal peptide that can be processed by a mammalian cell, including the human B2M leader. Such sequences are well-known in the art.

The terms "peptide," "polypeptide," and "protein" are used interchangeably herein, and refer to a polymeric form of amino acids of any length, which can include coded and non-coded amino acids, chemically or biochemically modified or derivatized amino acids, and polypeptides having modified peptide backbones. The terms also include polypeptides that have co-translational (e.g., signal peptide cleavage) and post-translational modifications of the polypeptide, such as, for example, disulfide-bond formation, glycosylation, acetylation, phosphorylation, proteolytic cleavage, and the like.

Furthermore, as used herein, a "polypeptide" refers to a protein that includes modifications, such as deletions, additions, and substitutions (e.g., conservative in nature as would be known to a person in the art) to the native sequence, as long as the protein maintains the desired activity. These modifications can be deliberate, as through site-directed mutagenesis, or can be accidental, such as through mutations of hosts that produce the proteins, or errors due to PCR amplification or other recombinant DNA methods.

The term "recombinant," as used herein with respect to a nucleic acid molecule, means a polynucleotide of genomic, cDNA, viral, semisynthetic, and/or synthetic origin, which, by virtue of its origin or manipulation, is not associated with all or a portion of the polynucleotide sequences with which it is associated in nature. The term "recombinant," as used with respect to a protein or polypeptide, refers to a polypeptide produced by expression from a recombinant polynucleotide. The term "recombinant," as used with respect to a host cell or a virus, refers to a host cell or virus into which a recombinant polynucleotide has been introduced. Recombinant is also used herein to refer to, with reference to material (e.g., a cell, a nucleic acid, a protein, or a vector) that the material has been modified by the introduction of a heterologous material (e.g., a cell, a nucleic acid, a protein, or a vector).

The terms "polynucleotide," "oligonucleotide," "nucleic acid" and "nucleic acid molecule" are used interchangeably herein to include a polymeric form of nucleotides, either ribonucleotides or deoxyribonucleotides. This term refers only to the primary structure of the molecule.

"Vector" refers to a polynucleotide capable of being duplicated within a biological system or that can be moved between such systems. Vector polynucleotides typically contain elements, such as origins of replication, polyadenylation signal or selection markers, that function to facilitate the duplication or maintenance of these polynucleotides in a biological system, such as a cell, virus, animal, plant, and reconstituted biological systems utilizing biological components capable of duplicating a vector. The vector polynucleotide may be DNA or RNA molecules, cDNA, or a hybrid of these, single stranded or double stranded.

"Expression vector" refers to a vector that can be utilized in a biological system or in a reconstituted biological system to direct the translation of a polypeptide encoded by a polynucleotide sequence present in the expression vector.

"Valent" refers to the presence of a specified number of binding sites specific for an antigen in a molecule. As such, the terms "monovalent," "bivalent," "tetravalent," and "hexavalent" refer to the presence of one, two, four and six binding sites, respectively, specific for an antigen in a molecule.

As used herein, the term "heterologous" used in reference to nucleic acid sequences, proteins or polypeptides, means that these molecules are not naturally occurring in the cell from which the heterologous nucleic acid sequence, protein or polypeptide was derived. For example, the nucleic acid sequence coding for a human polypeptide that is inserted into a cell that is not a human cell is a heterologous nucleic acid sequence in that particular context. Whereas heterologous nucleic acids may be derived from different organism or animal species, such nucleic acid need not be derived from separate organism species to be heterologous. For example, in some instances, a synthetic nucleic acid sequence or a polypeptide encoded therefrom may be heterologous to a cell into which it is introduced in that the cell did not previously contain the synthetic nucleic acid. As such, a synthetic nucleic acid sequence or a polypeptide encoded therefrom may be considered heterologous to a human cell, e.g., even if one or more components of the synthetic nucleic acid sequence or a polypeptide encoded therefrom was originally derived from a human cell.

A "host cell," as used herein, denotes an in vivo or in vitro eukaryotic cell or a cell from a multicellular organism (e.g., a cell line) cultured as a unicellular entity, which eukaryotic cells can be, or have been, used as recipients for a nucleic acid (e.g., an expression vector that comprises a nucleotide sequence encoding a multimeric polypeptide of the present disclosure), and include the progeny of the original cell which has been genetically modified by the nucleic acid. It is understood that the progeny of a single cell may not necessarily be completely identical in morphology or in genomic or total DNA complement as the original parent, due to natural, accidental, or deliberate mutation. A "recombinant host cell" (also referred to as a "genetically modified host cell") is a host cell into which has been introduced a heterologous nucleic acid, e.g., an expression vector. For example, a genetically modified eukaryotic host cell is genetically modified by virtue of introduction into a suitable eukaryotic host cell a heterologous nucleic acid, e.g., an exogenous nucleic acid that is foreign to the eukaryotic host cell, or a recombinant nucleic acid that is not normally found in the eukaryotic host cell.

"Specific binding" or "specifically binds" or "binds" refers to an antibody binding to a specific antigen with greater affinity than for other antigens. Typically, the antibody "specifically binds" when the equilibrium dissociation constant (KD) for binding is about 1×10-8 M or less, for example about 1×10-9 M or less, about 1×10-10 M or less, about 1×10-11 M or less, or about 1×10-12 M or less, typically with the KD that is at least one hundred-fold less than its KD for binding to a non-specific antigen (e.g., BSA, casein). The KD may be measured using standard procedures.

As used herein, the terms "treatment," "treating," and the like, refer to obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. "Treatment," as used herein, covers any treatment of a disease in a mammal, e.g., in a human, and includes: (a) preventing the disease from occurring in a subject which may be predisposed to the disease but has not yet been diagnosed as having it; (b) inhibiting the disease, i.e., arresting its development; and (c) relieving the disease, i.e., causing regression of the disease.

The terms "individual," "subject," "host," and "patient," used interchangeably herein, refer to a mammal, including, but not limited to, murines (e.g., rats, mice), lagomorphs (e.g., rabbits), non-human primates, humans, canines, felines, ungulates (e.g., equines, bovines, ovines, porcines, caprines), etc.

A "therapeutically effective amount" or "efficacious amount" refers to the amount of an agent, or combined amounts of two agents, that, when administered to a mammal or other subject for treating a disease, is sufficient to effect such treatment for the disease. The "therapeutically effective amount" will vary depending on the agent(s), the disease and its severity and the age, weight, etc., of the subject to be treated.

It is to be understood that this disclosure is not limited to particular embodiments described, as such may, of course, vary. It is also to be understood that the terminology used herein is for the purpose of describing particular embodiments only, and is not intended to be limiting.

Herein is described monoclonal antibodies and antigen-binding fragments thereof that specifically bind and neutralize, inhibit, block, abrogate, reduce, or interfere with, at least one activity of IL-1β, e.g., a functional activity of IL-1β to its receptor IL-1RI. The anti-IL-1β antibodies and antigen binding fragments can be therapeutically administered to a subject to treat IL-1β mediated diseases.

Composition of Anti-IL-1P Antibody and Antigen Binding Fragment

The disclosure provides for a mouse monoclonal antibody, designated as TAVO304, which was identified from a mouse hybridoma screening, that specifically binds and neutralizes, inhibits, blocks, abrogates, reduces, or interferes with, at least one activity of human interleukin 1β(IL-1β). TAVO304 comprises a heavy chain variable region sequence with amino acid sequence of SEQ ID NO. 1, and a light chain variable region sequence with amino acid sequence of SEQ ID No. 2. The heavy chain variable region of TAVO304 comprises three Complementarity Determining Regions, designated as HCDR1, HCDR2 and HCDR3, with amino acid sequence set forth as SEQ ID NO. 3, SEQ ID NO. 4 and SEQ ID NO. 5, respectively. The light chain variable region of TAVO304 comprises three Complementarity Determining Regions, designated as LCDR1, LCDR2 and LCDR3, with amino acid sequence set forth as SEQ ID NO. 6, SEQ ID NO. 7 and SEQ ID NO. 8, respectively.

Heavy chain variable region sequence of anti-human IL-1β mouse monoclonal antibody TAVO304

```
                                         (SEQ ID NO: 1)
DVQLVESGGGLVQPGGSRKLSCAASGFTFSSFGMHWVRQAPEKGLE

WVAYISIGSYTVHYADTVKGRFTISRDNPKNTLFLQMTSLRSEDTA

MYYCVRDDYDVTDYTMDYWGQGTSVTVSS
```

The sequence of three CDRs of heavy chain are underlined.

Light chain variable region sequence of Anti-human IL-1β mouse monoclonal antibody TAVO304

```
                                         (SEQ ID NO: 2)
DIVMSQSPSSLAVSTGEKVTMSCKSSQSLLNSRTRKNYLAWYQQKP

GQSPKLLIYWASTRESGVPDRFTGSGSGTDFTLTIGSVQAEDLAVY

YCKQTYNFPTFGGGTKLEIK
```

The sequence of three CDRs of light chain are underlined.

HCDR1 sequence of Anti-human IL-1β mouse monoclonal antibody TAVO30

```
                                         (SEQ ID NO: 3)
                  GFTFSSFGMH
```

HCDR2 sequence of Anti-human IL-1β mouse monoclonal antibody TAVO304

```
                                         (SEQ ID NO: 4)
                  YISIGSYTVH
```

HCDR3 sequence of Anti-human IL-1β mouse monoclonal antibody TAVO304 (SEQ ID NO: 5)

```
                                         (SEQ ID NO: 5)
                 DDYDVTDYTMDY
```

LCDR1 sequence of Anti-human IL-1β mouse monoclonal antibody

```
                                         (SEQ ID NO: 6)
              KSSQSLLNSRTRKNYLA
```

LCDR2 sequence of Anti-human IL-1β mouse monoclonal antibody TAVO304

```
                                         (SEQ ID NO: 7)
                   WASTRES
```

LCDR3 sequence of Anti-human IL-1β mouse monoclonal antibody

```
                                         (SEQ ID NO: 8)
                   KQTYNFPT
```

The mouse anti-human IL-1β antibody TAVO304 can be humanized by grafting of mouse CDRs onto human germline scaffolds. A few key mouse residues are preserved by back mutations to achieve higher stability and better expression while minimizing immunogenicity. For TAVO304, one humanized VH variant (304VH1) is designed based on IGHV3-48*01 and four humanized VL variants are designed with 304VL1 and 304VL2 based on IGKV1-39*01 and 304VL3 and 304VL4 based on IGKV2-40*01 with a couple of back mutations.

Based on the foregoing, the disclosure provides for one humanized heavy chain variable region of TAVO304, designated as 304VH1, with amino acid sequence set forth as SEQ ID NO. 9.

Humanized heavy chain variable region 304VH1 sequence (SEQ ID NO: 9)

```
                                          (SEQ ID NO: 9)
EVQLVESGGGLVQPGGSLRLSCAASGFTFSSFGMHWVRQAPGKGLE

WVAYISIGSYTVHYADSVKGRFTISRDNAKNSLYLQMNSLRDEDTA

VYYCVRDDYDVTDYTMDYWGQGTTVTVSS
```

The sequences of three CDRs of humanized heavy chain are underlined.

The disclosure provides for four humanized light chain variable region of TAVO304, designated as 304VL1, 304VL2, 304VL3 and 304VL4, with amino acid sequences set forth as SEQ ID NO. 10, SEQ ID NO. 11, SEQ ID NO. 12, and SEQ ID NO. 13, respectively.

Humanized light chain variable region 304VL1 sequence (SEQ ID NO: 10)

```
                                         (SEQ ID NO: 10)
DIQMTQSPSSLSASVGDRVTITCKSSQSLLNSRTRKNYLAWYQQKPGKAP

KLLIYWASTRESGVPSRFSGSGSGTDFTLTISSLQPEDFATYYCKQTYNF

PTFGQGTKLEIK
```

The sequences of three CDRs of humanized light chain are underlined.

Humanized light chain variable region 304VL2 sequence (SEQ ID NO: 11)

```
                                         (SEQ ID NO: 11)
DIQMTQSPSSLSASVGDRVTMTCKSSQSLLNSRTRKNYLAWYQQKPGKAP

KLLIYWASTRESGVPSRFSGSGSGTDFTLTISSVQPEDLATYYCKQTYNF

PTFGQGTKLEIK
```

The sequences of three CDRs of humanized light chain are underlined

Humanized light chain variable region 304VL3 sequence (SEQ ID NO: 12)

```
                                         (SEQ ID NO: 12)
DIVMTQTPLSLPVTPGEPASISCKSSQSLLNSRTRKNYLAWYLQKPGQSP

QLLIYWASTRESGVPDRFSGSGSGTDFTLKISRVEAEDVGVYYCKQTYNF

PTFGQGTKLEIK
```

The sequences of three CDRs of humanized light chain are underlined.

Humanized light chain variable region 304VL4 sequence (SEQ ID NO: 13)

```
                                         (SEQ ID NO: 13)
DIVMTQTPLSLPVTPGEPVSMSCKSSQSLLNSRTRKNYLAWYLQKPGQSP

QLLIYWASTRESGVPDRFSGSGSGTDFTLKISRVEAEDVGVYYCKQTYNF

PTFGQGTKLEIK
```

The sequences of three CDRs of humanized light chain are underlined.

By pairing the humanized 304VH1 heavy chain with the four humanized light chains, four humanized antibodies for TAVO304 can be generated. The disclosure provides for one humanized IgG1 antibody for TAVO304 comprising humanized heavy chain variable region 304VH1 and humanized light chain variable region 304VL1, designated as TAVO7376, comprising heavy chain sequence set forth as SEQ ID NO. 14 and light chain sequence set forth as SEQ ID NO. 15.

The disclosure provides for a second humanized IgG1 antibody for TAVO304 comprising humanized heavy chain variable region 304VH1 and humanized light chain variable region 304VL2, designated as TAVO7377, comprising heavy chain sequence set forth as SEQ ID NO. 14 and light chain sequence set forth as SEQ ID NO. 16.

The disclosure provides for a third humanized IgG1 antibody for TAVO304 comprising humanized heavy chain variable region 304VH1 and humanized light chain variable region 304VL3, designated as TAVO7378, comprising heavy chain sequence set forth as SEQ ID NO. 14 and light chain sequence set forth as SEQ ID NO. 17.

The disclosure provides for a fourth humanized IgG1 antibody for TAVO304 comprising humanized heavy chain variable region 304VH1 and humanized light chain variable region 304VL4, designated as TAVO7379, comprising heavy chain sequence set forth as SEQ ID NO. 14 and light chain sequence set forth as SEQ ID NO. 18.

Anti-human IL-1P humanized IgG1 antibody Heavy Chain based on 304VH1 (SEQ ID NO: 14)

```
                                         (SEQ ID NO: 14)
EVQLVESGGGLVQPGGSLRLSCAASGFTFSSFGMHWVRQAPGKGLEWVAY

ISIGSYTVHYADSVKGRFTISRDNAKNSLYLQMNSLRDEDTAVYYCVRDD

YDVTDYTMDYWGQGTTVTVSSASTKGPSVFPLAPSSKSTSGGTAALGCLV

KDYFPEPVTVSWNSGALTSGVHTFPAVLQSSGLYSLSSVVTVPSSSLGTQ

TYICNVNHKPSNTKVDKKVEPKSCDKTHTCPPCPAPELLGGPSVFLFPPK

PKDTLMISRTPEVTCVVVDVSHEDPEVKFNWYVDGVEVHNAKTKPREEQY

NSTYRVVSVLTVLHQDWLNGKEYKCKVSNKALPAPIEKTISKAKGQPREP

QVYTLPPSREEMTKNQVSLTCLVKGFYPSDIAVEWESNGQPENNYKTTPP

VLDSDGSFFLYSRLTVDKSRWQQGNVFSCSVMHEALHNHYTQKSLSLSPG

K
```

The sequence of variable domain of heavy chain is underlined. The K409R mutation is bolded.

Anti-human IL-1P humanized IgG1 antibody Light Chain based on 304VL1

```
                                         (SEQ ID NO: 15)
DIQMTQSPSSLSASVGDRVTITCKSSQSLLNSRTRKNYLAWYQQKPGKAP

KLLIYWASTRESGVPSRFSGSGSGTDFTLTISSLQPEDFATYYCKQTYNF
```

-continued

```
PTFGQGTKLEIKRTVAAPSVFIFPPSDEQLKSGTASVVCLLNNFYPREAK

VQWKVDNALQSGNSQESVTEQDSKDSTYSLSSTLTLSKADYEKHKVYACE

VTHQGLSSPVTKSFNRGEC
```

The sequence of variable domain of light chain is underlined.

Anti-human IL-1β humanized IgG1 antibody Light Chain based on 304VL2 (SEQ ID NO: 16)

```
                                          (SEQ ID NO: 16)
DIQMTQSPSSLSASVGDRVTMTCKSSQSLLNSRTRKNYLAWYQQKPGKAP

KLLIYWASTRESGVPSRFSGSGSGTDFTLTISSVQPEDLATYYCKQTYNF

PTFGQGTKLEIKRTVAAPSVFIFPPSDEQLKSGTASVVCLLNNFYPREAK

VQWKVDNALQSGNSQESVTEQDSKDSTYSLSSTLTLSKADYEKHKVYACE

VTHQGLSSPVTKSFNRGEC
```

The sequence of variable domain of light chain is underlined.

Anti-human IL-1β humanized IgG1 antibody Light Chain based on 304VL3

```
                                          (SEQ ID NO: 17)
DIVMTQTPLSLPVTPGEPASISCKSSQSLLNSRTRKNYLAWYLQKPGQSP

QLLIYWASTRESGVPDRFSGSGSGTDFTLKISRVEAEDVGVYYCKQTYNF

PTFGQGTKLEIKRTVAAPSVFIFPPSDEQLKSGTASVVCLLNNFYPREAK

VQWKVDNALQSGNSQESVTEQDSKDSTYSLSSTLTLSKADYEKHKVYACE

VTHQGLSSPVTKSFNRGEC
```

The sequence of variable domain of light chain is underlined.

Anti-human IL-1β humanized IgG1 antibody Light Chain based on 304VL4

```
                                          (SEQ ID NO: 18)
DIVMTQTPLSLPVTPGEPVSMSCKSSQSLLNSRTRKNYLAWYLQKPGQSP

QLLIYWASTRESGVPDRFSGSGSGTDFTLKISRVEAEDVGVYYCKQTYNF

PTFGQGTKLEIKRTVAAPSVFIFPPSDEQLKSGTASVVCLLNNFYPREAK

VQWKVDNALQSGNSQESVTEQDSKDSTYSLSSTLTLSKADYEKHKVYACE

VTHQGLSSPVTKSFNRGEC
```

The sequence of variable domain of light chain is underlined.

The disclosure also provides for preparation of a bispecific antibody or multispecific antibody that can include the engagement of any two, three, or four IL-13 epitopes by having Fab or scFv domains comprising the one humanized heavy chain variable region of TAVO304, designated as 304VH1, with amino acid sequence set forth as SEQ ID NO. 9 with one of the four humanized light chain variable region of TAVO304, designated as 304VL1, 304VL2, 304VL3 and 304VL4, with amino acid sequences set forth as SEQ ID NO. 10, SEQ ID NO. 11, SEQ ID NO. 12, and SEQ ID NO. 13, respectively. For instance, this can be a bispecific antibody that has Fab or scFv domains 304VH1 with 304VL1 and 304VH1 with 304VL2; 304 VH1 with 304VL1 and 304VH1 with 304VL3; 304 VH1 with 304VL1 and 304VH1 with 304VL4; or any other permutation of domains that can engagement two, three, or four epitopes.

The IL-1β binding antibodies and fragments of the present disclosure encompass antigen-binding fragments that retain sufficient ability to specifically bind to IL-1β. The IL-1β binding fragments as used herein may include any 3 or more contiguous amino acids (e.g., 4 or more, 5 or more 6 or more, 8 or more, or even 10 or more contiguous amino acids) of the antibody and encompasses Fab, Fab', F(ab')2, and F(v) fragments, or the individual light or heavy chain variable regions or portions thereof. These fragments lack the Fe fragment of an intact antibody, clear more rapidly from the circulation, and can have less non-specific tissue binding than an intact antibody. These fragments can be produced from intact antibodies using well known methods, for example by proteolytic cleavage with enzymes such as papain (to produce Fab fragments) or pepsin (to produce F(ab')2 fragments).

The IL-1β binding antibodies and fragments of the present disclosure may also encompass diabodies, which are bivalent antibodies in which VH and VL domains are expressed on a single polypeptide chain, but using a linker that is too short to allow for pairing between the two domains on the same chain, thereby forcing the domains to pair with complementary domains of another chain and creating two antigen binding sites.

The IL-1β binding antibodies and fragments of the present disclosure may also encompass single-chain antibody fragments (scFv) that bind to IL-1β. An scFv comprises an antibody heavy chain variable region ($V_H$) operably linked to an antibody light chain variable region ($V_L$) wherein the heavy chain variable region and the light chain variable region, together or individually, form a binding site that binds IL-1β. Such IL-1β binding fragments can be prepared by methods known in the art such as, for example, the synthesis or PCR mediated amplification of the variable portions of the heavy and light chains of an antibody molecule and a flexible protein linker composed of the amino acids Gly and Ser. The resulting DNA fragment is cloned for expression in E. coli or mammalian cells. The expressed IL-1β binding fragments are purified from the host cells.

The IL-1β binding antibodies and fragments of the present disclosure encompass full length antibody comprising two heavy chains and two light chains. Exemplary human or humanized antibodies include IgG, IgM, IgE, IgA, and IgD antibodies. The present antibodies can be of any class (IgG, IgM, IgE, IgGA, IgD, etc.) or isotype. For example, a human antibody can comprise an IgG $F_c$ domain, such as at least one of isotypes, IgG1, IgG2, IgG3 or IgG4.

In some instances, an IgG $F_c$ domain comprises an amino acid sequence having at least 70%, at least 75%, at least 80%, at least 85%, at least 90%, at least 95%, at least 98%, at least 99%, or 100%, amino acid sequence identity to an IgG1 Fc sequence as SEQ ID NO: 19.

In some instances, an IgG Fc domain comprises an amino acid sequence having at least 70%, at least 75%, at least 80%, at least 85%, at least 90%, at least 95%, at least 98%, at least 99%, or 100%, amino acid sequence identity to an IgG2 Fc sequence as SEQ ID NO: 20.

In some instances, an IgG Fc domain comprises an amino acid sequence having at least 70%, at least 75%, at least 80%, at least 85%, at least 90%, at least 95%, at least 98%, at least 99%, or 100%, amino acid sequence identity to an IgG3 Fc sequence as SEQ ID NO: 21.

In some instances, an IgG Fc domain comprises an amino acid sequence having at least 70%, at least 75%, at least 80%, at least 85%, at least 90%, at least 95%, at least 98%, at least 99%, or 100%, amino acid sequence identity to an IgG4 Fc sequence as SEQ ID NO: 22.

A S228P mutation may be made into IgG4 antibodies to enhance IgG4 stability.

IgG$_1$ F$_c$ (SEQ ID NO: 19):
KVEPKSCDKTHTCPPCPAPELLGGPSVFLFPPKPKDTLMISRTPEVTCVV
VDVSHEDPEVKFNWYVDGVEVHNAKTKPREEQYNSTYRVVSVLTVLHQDW
LNGKEYKCKVSNKALPAPIEKTISKAKGQPREPQVYTLPPSRDELTKNQV
SLTCLVKGFYPSDIAVEWESNGQPENNYKTTPPVLDSDGSFFLYSKLTVD
KSRWQQGNVFSCSVMHEALHNHYTQKSLSLSPGK

IgG$_2$ F$_c$ (SEQ ID NO: 20):
TVERKCCVECPPCPAPPVAGPSVFLFPPKPKDTLMISRTPEVTCVVVDVS
HEDPEVQFNWYVDGVEVHNAKTKPREEQFNSTFRVVSVLTVVHQDWLNGK
EYKCKVSNKGLPAPIEKTISKTKGQPREPQVYTLPPSREEMTKNQVSLTC
LVKGFYPSDIAVEWESNGQPENNYKTTPPMLDSDGSFFLYSKLTVDKSRW
QQGNVFSCSVMHEALHNHYTQKSLSLSPGK

IgG$_3$ F$_c$ (SEQ ID NO: 21):
RVELKTPLGDTTHTCPPCPAPELLGGPSVFLFPPKPKDTLMISRTPEVTC
VVVDVSHEDPEVKFNWYVDGVEVHNAKTKPREEQYNSTYRVVSVLTVLHQ
DWLNGKEYKCKVSNKALPAPIEKTISKAKGQPREPQVYTLPPSRDELTKN
QVSLTCLVKGFYPSDIAVEWESNGQPENNYKTTPPVLDSDGSFFLYSKLT
VDKSRWQQGNVFSCSVMHEALHNHYTQKSLSLSPGK

IgG$_4$ F$_c$ (SEQ ID NO: 22)
RVESKYGPPCPSCPAPEFLGGPSVFLFPPKPKDTLMISRTPEVTCVVVDV
SQEDPEVQFNWYVDGVEVHNAKTKPREEQFNSTYRVVSVLTVLHQDWLNG
KEYKCKVSNKGLPSSIEKTISKAKGQPREPQVYTLPPSQEEMTKNQVSLT
CLVKGFYPSDIAVEWESNGQPENNYKTTPPVLDSDGSFFLYSRLTVDKSR
WQEGNVFSCSVMHEALHNHYTQKSLSLSLGK

The present anti-IL-1β antibodies may comprise a modified F$_c$ region, wherein the modified F$_c$ region comprises at least one amino acid modification relative to a wild-type F$_c$ region. In some embodiments, the present anti-IL-1β antibodies are provided with a modified F$_c$ region where a naturally-occurring F$_c$ region is modified to extend the half-life of the antibody when compared to the parental wild-type antibody in a biological environment, for example, the serum half-life or a half-life measured by an in vitro assay.

Exemplary mutations that may be made singularly or in combinations are T250Q, M252Y, I253A, S254T, T256E, P257I, T307A, D376V, E380A, M428L, H433K, N434S, N434A, N434H, N434F, H435A and H435R mutations.

In certain embodiments, the extension of half-life can be realized by engineering the M252Y/S254T/T256E mutations in IgG1 Fc as SEQ ID NO: 23, residue numbering according to the EU Index (Dall'Acqua, Kiener et al. 2006).

In certain embodiments, the extension of half-life can also be realized by engineering the M428L/N434S mutations in IgG1 Fe as SEQ ID NO: 24 (Zalevsky, Chamberlain et al. 2010).

In certain embodiments, the extension of half-life can also be realized by engineering the T250Q/M428L mutations in IgG1 Fe as SEQ ID NO: 25 (Hinton, Xiong et al. 2006).

In certain embodiments, the extension of half-life can also be realized by engineering the N434A mutations in IgG1 F$_c$ as SEQ ID NO: 26 (Shields, Namenuk et al. 2001).

In certain embodiments, the extension of half-life can also be realized by engineering the T307A/E380A/N434A mutations in IgG1 F$_c$ as SEQ ID NO: 27 (Petkova, Akilesh et al. 2006).

The effect F$_c$ engineering on the extension of antibody half-life can be evaluated in PK studies in mice relative to antibodies with native IgG F$_c$.

IgG$_1$ F$_c$ with M252Y/S254T/T256E mutations
(SEQ ID NO: 23)
KVEPKSCDKTHTCPPCPAPELLGGPSVFLFPPKPKDTLYITREPEVTCVV
VDVSHEDPEVKFNWYVDGVEVHNAKTKPREEQYNSTYRVVSVLTVLHQDW
LNGKEYKCKVSNKALPAPIEKTISKAKGQPREPQVYTLPPSRDELTKNQV
SLTCLVKGFYPSDIAVEWESNGQPENNYKTTPPVLDSDGSFFLYSKLTVD
KSRWQQGNVFSCSVMHEALHNHYTQKSLSLSPGK IgG$_1$ F$_c$ with M428L/N434S mutations
(SEQ ID NO: 24)
KVEPKSCDKTHTCPPCPAPELLGGPSVFLFPPKPKDTLMISRTPEVTCVV
VDVSHEDPEVKFNWYVDGVEVHNAKTKPREEQYNSTYRVVSVLTVLHQDW
LNGKEYKCKVSNKALPAPIEKTISKAKGQPREPQVYTLPPSRDELTKNQV
SLTCLVKGFYPSDIAVEWESNGQPENNYKTTPPVLDSDGSFFLYSKLTVD
KSRWQQGNVFSCSVLHEALHSHYTQKSLSLSPGK IgG$_1$ F$_c$ with T250Q/M428L mutations
(SEQ ID NO: 25)
KVEPKSCDKTHTCPPCPAPELLGGPSVFLFPPKPKDQLMISRTPEVTCVV
VDVSHEDPEVKFNWYVDGVEVHNAKTKPREEQYNSTYRVVSVLTVLHQDW
LNGKEYKCKVSNKALPAPIEKTISKAKGQPREPQVYTLPPSRDELTKNQV
SLTCLVKGFYPSDIAVEWESNGQPENNYKTTPPVLDSDGSFFLYSKLTVD
KSRWQQGNVFSCSVLHEALHNHYTQKSLSLSPGK IgG$_1$ F$_c$ with N434A mutations
(SEQ ID NO: 26)
KVEPKSCDKTHTCPPCPAPELLGGPSVFLFPPKPKDTLMISRTPEVTCVV
VDVSHEDPEVKFNWYVDGVEVHNAKTKPREEQYNSTYRVVSVLTVLHQDW
LNGKEYKCKVSNKALPAPIEKTISKAKGQPREPQVYTLPPSRDELTKNQV
SLTCLVKGFYPSDIAVEWESNGQPENNYKTTPPVLDSDGSFFLYSKLTVD
KSRWQQGNVFSCSVMHEALHAHYTQKSLSLSPGK IgG$_1$ F$_c$ with T307A/E380A/N434A mutations
(SEQ ID NO: 27)
KVEPKSCDKTHTCPPCPAPELLGGPSVFLFPPKPKDTLMISRTPEVTCVV
VDVSHEDPEVKFNWYVDGVEVHNAKTKPREEQYNSTYRVVSVLAVLHQDW
LNGKEYKCKVSNKALPAPIEKTISKAKGQPREPQVYTLPPSRDELTKNQV
SLTCLVKGFYPSDIAVAWESNGQPENNYKTTPPVLDSDGSFFLYSKLTVD
KSRWQQGNVFSCSVMHEALHAHYTQKSLSLSPGK In some embodiments, the present anti-IL-1β antibodies are provided with a modified F$_c$ region where a naturally-occurring F$_c$ region is modified to enhance the antibody resistance to proteolytic degradation by a protease that cleaves the wild-type antibody between or at residues 222-237 (EU numbering).

In certain embodiments, the resistance to proteolytic degradation can be realized by engineering E233P/L234V/

L235A mutations in the hinge region with G236 deleted when compared to a parental wild-type antibody as SEQ ID NO: 28, residue numbering according to the EU Index (Kinder, Greenplate et al. 2013).

IgG$_1$ F$_c$ with E233P/L234V/L235A mutations and G236 deleted (SEQ ID NO: 28)
KVEPKSCDKTHTCPPCPAPPVAGPSVFLFPPKPKDTLMISRTPEVTCVVV

DVSHEDPEVKFNWYVDGVEVHNAKTKPREEQYNSTYRVVSVLTVLHQDWL

NGKEYKCKVSNKALPAPIEKTISKAKGQPREPQVYTLPPSRDELTKNQVS

LTCLVKGFYPSDIAVEWESNGQPENNYKTTPPVLDSDGSFFLYSKLTVDK

SRWQQGNVFSCSVMHEALHNHYTQKSLSLSPGK

In instances where effector functionality is not desired, the antibodies of the disclosure may further be engineered to introduce at least one mutation in the antibody Fc that reduces binding of the antibody to an activating F$_c$γ receptor (F$_c$γR) and/or reduces Fc effector functions such as C1q binding, complement dependent cytotoxicity (CDC), antibody-dependent cell-mediated cytotoxicity (ADCC) or phagocytosis (ADCP).

Fc positions that may be mutated to reduce binding of the antibody to the activating F$_c$γR and subsequently to reduce effector functions are those described for example in (Xu, Alegre et al. 2000) (Vafa, Gilliland et al. 2014) (Bolt, Routledge et al. 1993) (Chu, Vostiar et al. 2008) (Shields, Namenuk et al. 2001).

Exemplary mutations that may be made singularly or in combinations are K214T, E233P, L234V, L234A, deletion of G236, V234A, F234A, L235A, G237A, P238A, P238S, D265A, S267E, H268A, H268Q, Q268A, N297A, A327Q, P329A, D270A, Q295A, V309L, A327S, L328F, A330S and P331S mutations on IgG$_1$, IgG$_2$, IgG$_3$ or IgG$_4$.

Exemplary combination mutations that may be made to reduce ADCC are L234A/L235A on IgG$_1$, V234A/G237A/P238S/H268A/V309L/A330S/P331S on IgG$_2$, F234A/L235A on IgG$_4$, S228P/F234A/L235A on IgG$_4$, N297A on IgG$_1$, IgG$_2$, IgG$_3$ or IgG$_4$, V234A/G237A on IgG2, K214T/E233P/L234V/L235A/G236-deleted/A327G/P331A/D365E/L358M on IgG$_1$, H268Q/V309L/A330S/P331S on IgG$_2$, S267E/L328F on IgG$_1$, L234F/L235E/D265A on IgG$_1$, L234A/L235A/G237A/P238S/H268A/A330S/P331S on IgG$_1$, S228P/F234A/L235A/G237A/P238S on IgG$_4$, and S228P/F234A/L235A/G236-deleted/G237A/P238S on IgG$_4$. Hybrid IgG$_{2/4}$ F$_c$ domains may also be used, such as Fc with residues 117-260 from IgG$_2$ and residues 261-447 from IgG$_4$.

In some embodiments, the present anti-IL-1β antibodies are provided with a modified F$_c$ region where a naturally-occurring F$_c$ region is modified to facilitate the generation of bispecific antibody by F$_c$ heterodimerization.

In certain embodiments, the Fc heterodimerization can be realized by engineering F405L and K409R mutations on two parental antibodies and the generation of bispecific antibody in a process known as Fab arm exchange (Labrijn, Meesters et al. 2014).

In certain embodiments, the Fc heterodimerization can also be realized by Fc mutations to facilitate Knob-in-Hole strategy (see, e.g., Intl. Publ. No. WO 2006/028936). An amino acid with a small side chain (hole) is introduced into one F$_c$ domain and an amino acid with a large side chain (knob) is introduced into the other F$_c$ domain. After co-expression of the two heavy chains, a heterodimer is formed as a result of the preferential interaction of the heavy chain with a "hole" with the heavy chain with a "knob" (Ridgway, Presta et al. 1996).

Exemplary Fc mutation pairs forming a knob and a hole are: T366Y/F405A, T366W/F405W, F405W/Y407A, T394W/Y407T, T394S/Y407A, T366W/T394S, F405W/T394S and T366W/T366S/L368A/Y407V.

In certain embodiments, the Fc heterodimerization can also be realized by Fc mutations to facilitate the electrostatically-matched interactions strategy (Gunasekaran, Pentony et al. 2010). Mutations can be engineered to generate positively charged residues at one Fc domain and negatively charged residues at the other Fc domain as described in US Patent Publ. No. US2010/0015133; US Patent Publ. No. US2009/0182127; US Patent Publ. No. US2010/028637 or US Patent Publ. No. US2011/0123532. Heavy chain heterodimerization can be formed by electrostatically-matched interactions between two mutated Fc.

Antibodies of the disclosure further comprising conservative modifications are within the scope of the disclosure.

"Conservative modifications" refer to amino acid modifications that do not significantly affect or alter the binding characteristics of the antibody containing the amino acid sequences. Conservative modifications include amino acid substitutions, additions and deletions. Conservative substitutions are those in which the amino acid is replaced with an amino acid residue having a similar side chain. The families of amino acid residues having similar side chains are well defined and include amino acids with acidic side chains (e.g., aspartic acid, glutamic acid), basic side chains (e.g., lysine, arginine, histidine), nonpolar side chains (e.g., alanine, valine, leucine, isoleucine, proline, phenylalanine, methionine), uncharged polar side chains (e.g., glycine, asparagine, glutamine, cysteine, serine, threonine, tyrosine, tryptophan), aromatic side chains (e.g., phenylalanine, tryptophan, histidine, tyrosine), aliphatic side chains (e.g., glycine, alanine, valine, leucine, isoleucine, serine, threonine), amide (e.g., asparagine, glutamine), beta-branched side chains (e.g., threonine, valine, isoleucine) and sulfur-containing side chains (cysteine, methionine). Furthermore, any native residue in the polypeptide may also be substituted with alanine, as has been previously described for alanine scanning mutagenesis ((MacLennan, Rice et al. 1998); (Sasaki and Sutoh 1998)). Amino acid substitutions to the antibodies of the disclosure may be made by known methods for example by PCR mutagenesis (U.S. Pat. No. 4,683,195). Alternatively, libraries of variants may be generated for example using random (NNK) or non-random codons, for example DVK codons, which encode 11 amino acids (Ala, Cys, Asp, Glu, Gly, Lys, Asn, Arg, Ser, Tyr, Trp). The resulting antibody variants may be tested for their characteristics using assays described herein.

The antibodies of the disclosure may be post-translationally modified by processes such as glycosylation, isomerization, deglycosylation or non-naturally occurring covalent modification such as the addition of polyethylene glycol moieties (pegylation) and lipidation. Such modifications may occur in vivo or in vitro. For example, the antibodies of the disclosure may be conjugated to polyethylene glycol (PEGylated) to improve their pharmacokinetic profiles. Conjugation may be carried out by techniques known to those skilled in the art. Conjugation of therapeutic antibodies with PEG has been shown to enhance pharmacodynamics while not interfering with function (Leong, DeForge et al. 2001, Yang, Basu et al. 2003, Knight, Jordan et al. 2004).

Antibodies of the disclosure may be modified to improve stability, selectivity, cross-reactivity, affinity, immunogenicity or other desirable biological or biophysical property are within the scope of the disclosure. Stability of an antibody is influenced by a number of factors, including (1) core packing of individual domains that affects their intrinsic stability, (2) protein/protein interface interactions that have impact upon the HC and LC pairing, (3) burial of polar and charged residues, (4) H-bonding network for polar and charged residues; and (5) surface charge and polar residue distribution among other intra- and inter-molecular forces (Worn and Pluckthun 2001). Potential structure destabilizing residues may be identified based upon the crystal structure of the antibody or by molecular modelling in certain cases, and the effect of the residues on antibody stability may be tested by generating and evaluating variants harboring mutations in the identified residues. One of the ways to increase antibody stability is to raise the thermal transition midpoint ($T_m$) as measured by differential scanning calorimetry (DSC). In general, the protein $T_m$ is correlated with its stability and inversely correlated with its susceptibility to unfolding and denaturation in solution and the degradation processes that depend on the tendency of the protein to unfold (Remmele and Gombotz 2000). A number of studies have found correlation between the ranking of the physical stability of formulations measured as thermal stability by DSC and physical stability measured by other methods (Maa and Hsu 1996, Remmele, Nightlinger et al. 1997, Gupta and Kaisheva 2003, Bedu-Addo, Johnson et al. 2004, Zhang, Roy et al. 2004). Formulation studies suggest that a Fab $T_m$ has implication for long-term physical stability of a corresponding mAb.

Antibodies of the disclosure may have amino acid substitutions in the Fc region that improve manufacturing and drug stability. An example for $IgG_1$ is H224S (or H224Q) in the hinge 221-DKTHTC-226 (SEQ ID NO: 33) (Eu numbering) which blocks radically induced cleavage (Yates, Gunasekaran et al. 2010); and for IgG4, the S228P mutation blocks half-antibody exchange (Angal, King et al. 1993, Labrijn, Buijsse et al. 2009).

Expression and Purification of Anti-IL-1β Antibodies and Fragments

The anti-IL-1β antibodies and fragments of the disclosure can be encoded by a single nucleic acid (e.g., a single nucleic acid comprising nucleotide sequences that encode the light and heavy chain polypeptides of the antibody), or by two or more separate nucleic acids, each of which encode a different part of the antibody or antibody fragment.

As anon-limiting example, the disclosure provides nucleic acid sequence as SEQ ID NO: 29 which encodes the IgG1 heavy chain sequence of TAVO7378 as SEQ ID NO: 14, nucleic acid sequence as SEQ ID NO: 30 which encodes the light chain sequence of TAVO7378 as SEQ ID NO: 17.

TAVO7378 heavy chain nucleotide sequence
(SEQ ID NO: 29)
caggccgaggtgcagctggtggagtccggaggaggactggtgcagcccgg cggctctctgagactgagctgcgctgcctccggattcaccttcagcagct tcggcatgcactgggtgagacaagccccggcaagggactggagtgggtg gcctatatcagcatcggcagctacacagtgcactacgccgactccgtgaa aggaagattcaccattctagagacaacgccaagaactctctgtatctgc agatgaactctctgagggacgaagataccgccgtgtactactgcgtgagg gacgactacgacgtgaccgactacaccatggactactggggccaaggcac caccgtgacagtgagcagcgcgcagcaccaagggcccatcggtcttccccc tggcacctcctccaagagcacctctggggcacagcggccctgggctgc ctggtcaaggactacttccccgaaccggtgacggtgtcgtggaactcagg cgccctgaccagcggcgtgcacaccttcccggctgtcctacagtcctcag gactctactccctcagcagcgtggtgaccgtgccctccagcagcttgggc acccagacctacatctgcaacgtgaatcacaagcccagcaacaccaaggt ggacaagaaagttgagcccaaatcttgtgacaaaactcacacatgcccac cgtgcccagcacctgaactcctgggggaccgtcagtcttcctcttcccc ccaaaacccaaggacaccctcatgatctcccggacccctgaggtcacatg cgtggtggtggacgtgagccacgaagaccctgaggtcaagttcaactggt acgtggacggcgtggaggtgcataatgccaagacaaagccgcgggaggag cagtacaacagcacgtaccgtgtggtcagcgtcctcaccgtcctgcacca ggactggctgaatggcaaggagtacaagtgcaaggtctccaacaaagccc tcccagcccccatcgagaaaaccatctccaaagccaaagggcagccccga gaaccacaggtgtacaccctgcccccatcccgggaggagatgaccaagaa ccaggtcagcctgacctgcctggtcaaaggcttctatcccagcgacatcg ccgtggagtgggagagcaatgggcagccggagaacaactacaagaccacg cctcccgtgctggactccgacggctccttcttcctctacagcagactcac cgtggacaagagcaggtggcagcaggggaacgtcttctcatgctccgtga tgcatgaggctctgcacaaccactacacgcagaagagcctctccctgtct ccgggtaaa TAVO7378 light chain nucleotide sequence
(SEQ ID NO: 30)
gacattgtgatgacccagacccctctgtctctgcccgtgacacccggcga gcccgcctccatcagctgcaagtcctcccagtctctgctgaacagcagaa caagaaagaactatctggcttggtatctgcagaagcccggccagtcccct cagctgctgatttactgggccagcaccagagaaagcggcgtgcccgatag attctccggctccggcagcggaaccgatttcacactgaagatctctagag tggaagccgaggacgtgggcgtgtactactgcaagcagacctacaactttt cccaccttcggccaaggcaccaagctggagatcaagcgtacggtggctgc accatctgtcttcatcttcccgccatctgatgagcagttgaaatctggaa ctgcctctgttgtgtgcctgctgaataacttctatcccagagaggccaaa gtacagtggaaggtggataacgccctccaatcgggtaactcccaggagag tgtcacagagcaggacagcaaggacagcacctacagcctcagcagcaccc tgacgctgagcaaagcagactacgagaaacacaaagtctacgcctgcgaa gtcacccatcagggcctgagctcgcccgtcacaaagagcttcaacagggg agagtgt The nucleic acids described herein can be inserted into vectors, e.g., nucleic acid expression vectors and/or targeting vectors. Such vectors can be used in various ways, e.g., for the expression of an IL-1β binding antibody or antibody fragment in a cell or transgenic animal. Vectors are typically selected to be functional in the host cell in which the vector will be used. A nucleic acid molecule encoding an IL-1β binding antibody or fragment may be amplified/expressed in prokaryotic, yeast, insect (baculovirus systems) and/or eukaryotic host cells. Selection of the host cell will depend in part on whether the IL-1β binding antibody or fragment is to be post-translationally modified (e.g., glycosylated and/or phosphorylated). If so, yeast, insect, or mammalian host cells are preferable. Expression vectors typically contain one or more of the following components: a promoter, one or more enhancer sequences, an origin of replication, a transcriptional termination sequence, a complete intron sequence containing a donor and acceptor splice site, a leader sequence for secretion, a ribosome binding site, a polyadenylation sequence, a polylinker region for inserting the nucleic acid encoding the polypeptide to be expressed, and a selectable marker element.

In most cases, a leader or signal sequence is engineered at the N-terminus of the anti-IL-1β antibody or fragment to guide its secretion. The secretion of anti-IL-1β antibody or fragment from a host cell will result in the removal of the signal peptide from the antibody or fragment. Thus, the mature antibody or fragment will lack any leader or signal sequence. In some cases, such as where glycosylation is desired in a eukaryotic host cell expression system, one may manipulate the various presequences to improve glycosylation or yield. For example, one may alter the peptidase cleavage site of a signal peptide, or add prosequences, which also may affect glycosylation.

The disclosure further provides a cell (e.g., an isolated or purified cell) comprising a nucleic acid or vector of the disclosure. The cell can be any type of cell capable of being transformed with the nucleic acid or vector of the disclosure so as to produce a polypeptide encoded thereby. To express the IL-1β binding antibody or fragment, DNAs encoding partial or full-length light and heavy chains, obtained as described herein, are inserted into expression vectors such that the genes are operatively linked to transcriptional and translational control sequences.

Methods of introducing nucleic acids and vectors into isolated cells and the culture and selection of transformed host cells in vitro are known in the art and include the use of calcium chloride-mediated transformation, transduction, conjugation, triparental mating, DEAE, dextran-mediated transfection, infection, membrane fusion with liposomes, high velocity bombardment with DNA-coated microprojectiles, direct microinjection into single cells, and electroporation.

After introducing the nucleic acid or vector of the disclosure into the cell, the cell is cultured under conditions suitable for expression of the encoded sequence. The antibody, antigen binding fragment, or portion of the antibody then can be isolated from the cell.

In certain embodiments, two or more vectors that together encode an IL-1β binding antibody, or antigen binding fragment thereof, can be introduced into the cell.

Purification of an IL-1β binding antibody or fragment which has been secreted into the cell media can be accomplished using a variety of techniques including affinity, immunoaffinity or ion exchange chromatography, molecular sieve chromatography, preparative gel electrophoresis or isoelectric focusing, chromatofocusing, and high pressure liquid chromatography. For example, antibodies comprising a Fc region may be purified by affinity chromatography with Protein A, which selectively binds the Fc region.

Modified forms of an antibody or antigen binding fragment may be prepared with affinity tags, such as hexahistidine (SEQ ID NO: 34) or other small peptide such as FLAG (Eastman Kodak Co., New Haven, Conn.) or myc (Invitrogen) at either its carboxyl or amino terminus and purified by a one-step affinity column. For example, polyhistidine binds with great affinity and specificity to nickel, thus an affinity column of nickel (such as the Qiagen® nickel columns) can be used for purification of polyhistidine-tagged selective binding agents. In some instances, more than one purification step may be employed.

Binding and Activity of Anti-IL-1β Antibody and Fragment to IL-1β

The present disclosure encompasses anti-IL-1β antibodies and fragments that bind selectively to IL-1β in that they bind to IL-1β with greater affinity than to other antigens. The anti-IL-1β antibodies and fragments may bind selectively to human IL-1β, but also bind detectably to non-human IL-1β. Alternatively or additionally, the antibodies or fragments may bind to human IL-1β and to IL-1β of other mammal. For example, the antibodies or fragments may bind to one or more of rodent IL-1β, primate IL-1β, dog IL-1β, and rabbit IL-1β, or guinea pig IL-1β. Alternatively or additionally, the IL-1β binding antibodies or IL-1β binding fragments may have the same or substantially the same potency against recombinant human IL-1β and endogenous human IL-1β.

In vitro and cell based assays are well described in the art for use in determining binding of IL-1β to IL-1β receptor type I (IL-1R1). For example, the binding of IL-1β to IL-1β receptor type I may be determined by immobilizing an IL-1β binding antibody, sequestering IL-1β with the immobilized antibody and determining whether the IL-1β was bound to the antibody, and contacting a soluble form of IL-1R1 with the bound IL-1β/antibody complex and determining whether the soluble IL-1R1 was bound to the complex. The protocol may also include contacting the soluble IL-1R1 with the immobilized antibody before the contact with IL-1β, to confirm that the soluble IL-1R1 does not bind to the immobilized antibody. This protocol can be performed using a Biacore® instrument for kinetic analysis of binding interactions. Such a protocol can also be employed to determine whether an antibody or other molecule permits or blocks the binding of IL-1β to IL-1 receptor type I.

For other IL-1β/IL-1R1 binding assays, the permitting or blocking of IL-1β binding to IL-1β receptor type I may be determined by comparing the binding of IL-1β to IL-1RI in the presence or absence of IL-1β antibodies or IL-1β binding fragments thereof. Blocking is identified in the assay readout as a designated reduction of IL-1β binding to IL-1 receptor type I in the presence of anti-IL-1β antibodies or IL-1β binding fragments thereof, as compared to a control sample that contains the corresponding buffer or diluent but not an IL-1β antibody or IL-1β binding fragment thereof. The assay readout may be qualitatively viewed as indicating the presence or absence of blocking, or may be quantitatively viewed as indicating a percent or fold reduction in binding due to the presence of the antibody or fragment. When an IL-1β binding antibody or IL-1β binding fragment substantially blocks IL-1β binding to IL-1RI, the IL-1β binding to IL-1R1 is reduced by at least 10-fold, alternatively at least about 20-fold, alternatively at least about 50-fold, alternatively at least about 100-fold, alternatively at least about 1000-fold, alternatively at least about 10000-fold, or more, compared to binding of the same concentrations of IL-1β and IL-1R1 in the absence of the antibody or fragment.

The key amino acid residues (epitope) bound by the IL-1β binding antibody or fragment described in this disclosure may be determined using a peptide array, such as for example, a PepSpot™ peptide array (JPT Peptide Technologies, Berlin, Germany), wherein a scan of twelve amino-acid peptides, spanning the entire IL-1β amino acid sequence, each peptide overlapping by 11 amino acid to the previous one, is synthesized directly on a membrane. Alternatively or in addition, antibody competition experiments may be performed and such assays are well known in the art.

Preferred IL-1β antibodies or antibody fragments for use in accordance with the disclosure generally bind to human IL-1β with high affinity (e.g., as determined with BIA-CORE), such as for example with an equilibrium binding dissociation constant (KD) for IL-1β of about 10 nM or less, about 5 nM or less, about 1 nM or less, about 500 pM or less, or more preferably about 250 pM or less, about 100 pM or less, about 50 pM or less, about 25 pM or less, about 10 pM or less, about 5 pM or less, about 3 pM or less about 1 pM or less, about 0.75 pM or less, about 0.5 pM or less, or about 0.3 pM or less.

Antibodies or fragments of the present disclosure may, for example, bind to IL-1β with an EC50 of about 10 nM or less, about 5 nM or less, about 2 nM or less, about 1 nM or less, about 0.75 nM or less, about 0.5 nM or less, about 0.4 nM or less, about 0.3 nM or less, or about 0.2 nM or less, as determined by enzyme linked immunosorbent assay (ELISA).

Preferably, the antibody or antibody fragment of the present disclosure does not cross-react with any target other than IL-1β. For example, the present antibodies and fragments may bind to IL-1β, but do not detectably bind to IL-1a, or have at least about 100 times (e.g., at least about 150 times, at least about 200 times, or even at least about 250 times) greater selectivity in its binding of IL-1β relative to its binding of IL-1a.

The present disclosure also encompasses neutralizing antibodies or neutralizing fragments thereof which bind to IL-1β so as to neutralize biological activity of the IL-1β. Neutralization of biological activity of IL-1β can be assessed by assays for one or more indicators of IL-1β biological activity, such as IL-1β stimulated reporter gene expression in a reporter assay, IL-1β stimulated release of IL-6 from human fibroblasts or other cells, IL-1β, or IL-1β induced proliferation of T helper cells. Neutralization of biological activity of IL-1β can also be assessed in vivo by mouse arthritis models. Preferably the IL-1β binding antibodies and fragments of the present disclosure neutralize the biological activity of IL-1β connected with the signalling function of IL-1β receptor type I (IL-1R1) bound by the IL-1β.

In one embodiment, an antibody or fragment thereof of the present disclosure can neutralize, inhibit, block, abrogate, reduce or interfere with, an activity of IL-1β by binding to an epitope of IL-1β that is directly involved in the targeted activity of IL-1β. In another embodiment, an antibody or fragment thereof of the disclosure can neutralize, inhibit, block, abrogate, reduce or interfere with, an activity of IL-1β by binding to an epitope of IL-1β that is not directly involved in the targeted activity of IL-1β, but the antibody or fragment binding thereto sterically or conformationally inhibits, blocks, abrogates, reduces or interferes with, the targeted activity of IL-1β. In yet another embodiment, an antibody or fragment thereof of the disclosure binds to an epitope of IL-1β that is not directly involved in the targeted activity of IL-1β (i.e., a non-blocking antibody), but the antibody or fragment binding thereto results in the enhancement of the clearance of IL-1β.

In general, the antibodies and fragments of the present disclosure can neutralize, inhibit, block, abrogate, reduce, or interfere with the biological activity of IL-1β, regardless of whether the binding of IL-1β to IL1 receptor type I is blocked. More preferably, the IL-1β binding antibodies or IL-1β binding fragments neutralize the biological activity of IL-1β by binding to IL-1β, without substantially preventing the binding of the bound IL-1β to IL-1β receptor type I. A potential advantage of such antibodies and fragments is that they can bind and neutralize IL-1β while still permitting the IL-1β to bind to IL-1R1. This can result in an effective reduction in IL-1α biological activity as well as IL-1β biological activity, since there are fewer unbound IL-1R1 sites for IL-1α to bind to. Thus, IL-1β binding antibodies and fragments of the present disclosure are useful in methods where it is desirable to neutralize IL-1β in vitro and in vivo biological activity.

The present antibodies or fragments may be neutralizing antibodies or fragments which bind specifically to IL-1β epitope that affects biological activity of IL-1β. The present antibodies or fragments can bind to a neutralization-sensitive epitope of IL-1β. When a neutralization-sensitive epitope of IL-1β is bound by one of the present antibodies or fragments, the result is a loss of biological activity of the IL-1β containing the epitope.

Pharmaceutical Compositions

IL-1β binding antibodies and antibody fragments for use according to the present disclosure can be formulated in compositions, especially pharmaceutical compositions, for use in the methods herein. Such compositions comprise a therapeutically or prophylactically effective amount of an IL-1β binding antibody or antibody fragment of the disclosure in mixture with a suitable carrier, e.g., a pharmaceutically acceptable agent. Typically, IL-1β binding antibodies and antibody fragments of the disclosure are sufficiently purified for administration to an animal before formulation in a pharmaceutical composition.

Pharmaceutically acceptable agents include carriers, excipients, diluents, antioxidants, preservatives, coloring, flavoring and diluting agents, emulsifying agents, suspending agents, solvents, fillers, bulking agents, buffers, delivery vehicles, tonicity agents, cosolvents, wetting agents, complexing agents, buffering agents, antimicrobials, and surfactants.

The composition can be in liquid form or in a lyophilized or freeze-dried form and may include one or more lyoprotectants, excipients, surfactants, high molecular weight structural additives and/or bulking agents.

Compositions can be suitable for parenteral administration. Exemplary compositions are suitable for injection or infusion into an animal by any route available to the skilled worker, such as intraarticular, subcutaneous, intravenous, intramuscular, intraperitoneal, intracerebral (intraparenchymal), intracerebroventricular, intramuscular, intraocular, intraarterial, intralesional, intrarectal, transdermal, oral, and inhaled routes.

Pharmaceutical compositions described herein can be formulated for controlled or sustained delivery in a manner that provides local concentration of the product (e.g., bolus, depot effect), sustained release, and/or increased stability or half-life in a particular local environment.

Methods of Use

The present antibodies and fragments are useful for the prophylaxis and treatment of IL-1β-mediated diseases or medical conditions, e.g., inflammatory conditions, allergies and allergic conditions, hypersensitivity reactions, autoimmune diseases, severe infections, and organ or tissue transplant rejection.

Antibodies of the disclosure are particularly useful for the treatment, prevention, or amelioration of autoimmune disease and of inflammatory conditions, in particular inflammatory conditions with an aetiology including an autoimmune component such as arthritis (for example rheumatoid arthritis, arthritis chronica progrediente and arthritis deformans) and rheumatic diseases, including inflammatory conditions and rheumatic diseases involving bone loss, inflammatory pain, hypersensitivity (including both airways hypersensitivity and dermal hypersensitivity) and allergies.

Specific auto-immune diseases for which antibodies of the disclosure may be employed include autoimmune haematological disorders (including e.g., hemolytic anaemia, aplastic anaemia, pure red cell anaemia and idiopathic thrombocytopenia), systemic lupus erythematosus, polychondritis, sclerodoma, Wegener granulomatosis, dermatomyositis, chronic active hepatitis, myasthenia gravis, psoriasis, Steven-Johnson syndrome, idiopathic sprue, autoimmune inflammatory bowel disease (including e.g. ulcerative colitis, Crohn's disease and Irritable Bowel Syndrome), endocrine ophthalmopathy, Graves disease, sarcoidosis, multiple sclerosis, primary biliary cirrhosis, juvenile diabetes (diabetes mellitus type I), uveitis (anterior and posterior), keratoconjunctivitis sicca and vernal keratoconjunctivitis, interstitial lung fibrosis, psoriatic arthritis and glomerulonephritis (with and without nephrotic syndrome, e.g., including idiopathic nephrotic syndrome or minimal change nephropathy).

Antibodies of the disclosure are also useful for the treatment, prevention, or amelioration of asthma, bronchitis, pneumoconiosis, pulmonary emphysema, and other obstructive or inflammatory diseases of the airways.

The present antibodies and fragments are also contemplated for use in the treatment recipients of heart, lung, combined heart-lung, liver, kidney, pancreatic, skin or corneal transplants, including allograft rejection or xenograft rejection, or for the prevention of graft-versus-host disease, such as following bone marrow transplant, or organ transplant associated arteriosclerosis.

Antibodies of the disclosure are particularly useful for treating diseases of bone metabolism including osteoarthritis, osteoporosis and other inflammatory arthritides, and bone loss in general, including age-related bone loss, and in particular periodontal disease.

Antibodies of the disclosure are also useful for the reduction, prevention or treatment of cardiovascular events and/or cardiovascular diseases, including myocardial infarction, stroke, cardiovascular death, congestive heart failure, cardiac arrest, acute coronary syndrome, angina, or a revascularization procedure.

Antibodies of the disclosure are also useful for the prevention or treatment of cancers, including lung cancer, pancreatic cancer and breast cancer. In one embodiment, an anti-IL-1β antibody or fragment thereof as disclosed herein may be used in an effective amount for the treatment and/or prevention of lung cancer. In another embodiment, an anti-IL-1β antibody or fragment thereof as disclosed herein may be used in an effective amount for the treatment and/or prevention of pancreatic cancer. In another embodiment, an anti-IL-1β antibody or fragment thereof as disclosed herein may be used in an effective amount for the treatment and/or prevention of breast cancer.

Anti-IL-1β antibodies in an effective amount may be used in the present disclosure for the treatment and/or prevention of Type 1 diabetes, Type 2 diabetes, obesity, hyperglycemia, hyperinsulinemia, insulin resistance and disease states and conditions characterized by insulin resistance. Such methods may be used to treat a mammalian subject (e.g., human) suffering from Type 2 diabetes, Type 1 diabetes, obesity, hyperglycemia, hyperinsulinemia, insulin resistance and disease states and conditions characterized by insulin resistance or to prevent occurrence of the same in an at risk subject. In one embodiment, an anti-IL-1β antibody or fragment thereof as disclosed herein may be used in an effective amount for the treatment and/or prevention of Type 2 diabetes.

In addition to therapeutic uses, the present antibodies and fragments can be used in diagnostic methods to detect IL-1β (for example, in a biological sample, such as serum or plasma), using an immunoassay, such as an enzyme linked immunosorbent assays (ELISA), an radioimmunoassay (RIA) or tissue immunohistochemistry.

A method for detecting IL-1β in a biological sample can comprise the steps of contacting a biological sample with one or more of the present antibodies or fragments and detecting either the antibody or fragment bound to IL-1β or unbound antibody or fragment, to thereby detect IL-1β in the biological sample. The antibody or fragment can be directly or indirectly labelled with a detectable substance to facilitate detection of the bound or unbound antibody. Suitable detectable substances include various enzymes, prosthetic groups, fluorescent materials, luminescent materials and radioactive materials.

EXAMPLES

The following examples are provided to describe the present disclosure in greater detail. They are intended to illustrate, not to limit, the present disclosure.

Example 1: IL-1P Binding Affinity for Mouse Anti-IL-1β p Antibody TAVO304

By hybridoma screening, TAVO304 was identified as a mouse anti-human IL-1β antibody. ELISA-based binding assay was employed to evaluate TAVO304 binding to recombinant human IL-1β. In this assay, 1 μg/ml recombinant human IL-1β (R&D systems) were coated on ELISA plate. Increasing concentrations of TAVO304 antibodies were applied on the plate and their binding to the recombinant human IL-1P were detected by HRP-conjugated anti-mouse secondary antibody. It was observed that TAVO304 dose-dependently bound recombinant human IL-1β with EC50 at 3.6 ng/mL (FIG. 1).

The binding of TAVO304 to mouse and Rhesus monkey IL-1β were also evaluated in similar ELISA assay by coating the plate with mouse and Rhesus monkey IL-1β respectively. TAVO304 did not show significant binding affinity to mouse IL-1β (FIG. 1). In contrast, it showed good binding affinity to Rhesus monkey IL-1β, with EC50 at 12.2 ng/mL.

Example 2: In Vitro Assay for IL-1β Neutralization by TAVO304

Figure 2:
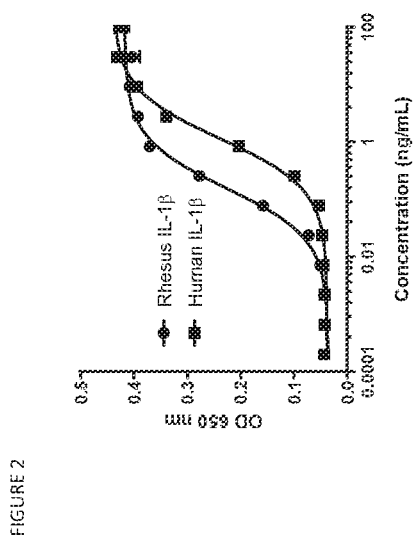
FIG. 2: The response of reporter gene expression upon stimulation by human and rhesus monkey IL1β in HEK-Blue IL-1β reporter assay.

A HEK-Blue IL-1β reporter assay was developed to assess functional activity of IL-1I. In this assay, HEK-Blue IL-1β cells (Invivogen) express IL-1β receptor IL-1R and a secreted embryonic alkaline phosphatase (SEAP) reporter gene under the control of the IFN-β minimal promoter fused to five NF-κB and five AP-1 binding sites. Binding of IL-1β to its receptor IL-1R on the surface of HEK-Blue IL-1β cells triggers a signalling cascade leading to the activation of NF-κB, and the subsequent production of SEAP (FIG. 2).

The response of HEK-Blue IL-1β reporter cell line to IL-1β was evaluated using this assay. It was observed that both human IL-1β and Rhesus IL-1β could dose-dependently induce reporter gene expression with EC50 at 1.14 ng/mL and 0.16 ng/mL respectively (FIG. 2).

The HEK-Blue IL-1β reporter assay was then employed to evaluate TAVO304 in blocking human IL-1β driven reporter gene expression. Increasing amounts of antibodies along with 10 ng/mL human IL-1β were applied to HEK-Blue IL-1β reporter cells. After overnight incubation, the SEAP reporter gene expression was quantitated. It was observed that TAVO304 dose-dependently neutralized IL-1β-mediated reporter gene expression with IC50 at 0.12 ug/mL (FIG. 3), much more potent (>6 fold) than a reference antibody refAb-1 in IL-1β inhibition.

The same assay was also employed to evaluate TAVO304 in blocking rhesus monkey IL-1β driven reporter gene expression. Increasing amounts of antibodies along with 0.25 ng/mL rhesus monkey IL-1β were applied to HEK-Blue IL-1β reporter cells. It was observed that TAVO304 dose-dependently neutralized rhesus monkey IL-1β-mediated reporter gene expression with IC50 at 3.6 ng/mL (FIG. 3).

Example 3: Humanization of Mouse Anti-Human IL-1β Antibody TAVO304

Figure 4:
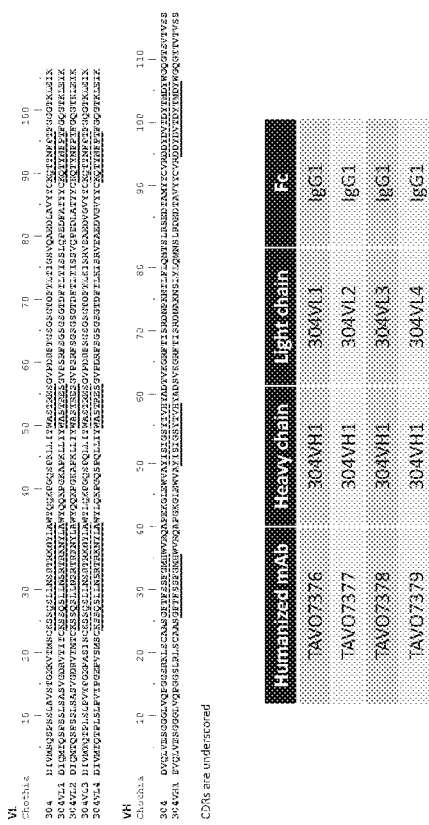
FIG. 4: Sequence alignments of heavy chain and light chain variable regions of TAVO304 with humanized VH and VL variants. Four humanized antibodies can be formed by paring the humanized VH variant (304VH1) with four humanized VL variants (304VL1, 304VL2, 304VL3, and 304VL4).

The mouse anti-human IL-1β antibody TAVO304 was humanized by grafting of mouse CDRs onto human germline scaffolds. A few key mouse residues were preserved by back mutations to achieve higher stability and better expression while minimizing immunogenicity. For TAVO304, one humanized VH variant (304VH1) was designed based on IGHV3-48*01 and four humanized VL variants were designed with 304VL1 and 304VL2 based on IGKV1-39*01 and 304VL3 and 304VL4 based on IGKV2-40*01 with a couple of back mutations (FIG. 4). By combination of the humanized VH variant with the four humanized VL variants, four humanized TAVO304 antibodies with IgG1 F$_c$, designated as TAVO7376, TAVO7377, TAVO7378, TAVO7379, were generated with 304VH1 variant paring with 304VL1, 304VL2, 304VL3 and 304VL4 respectively (FIG. 4).

Example 4: Expression and Purification of Humanized TAVO304

Plasmids encoding heavy chains and light chains of TAVO7376, TAVO7377, TAVO7378, TAVO7379 were co-transfected into Expi293F cells following the transfection kit instructions (Thermo Scientific). Cells were spun down five days post transfection, and the supernatant were passed through a 0.2 μm filter. The purification of expressed antibodies in supernatant was carried out by affinity chromatography over protein A agarose column (GE Healthcare Life Sciences). The purified antibodies were buffer-exchanged into DPBS, pH7.2 by dialysis, and protein concentrations were determined by UV absorbance at 280 nm.

Figure 5:
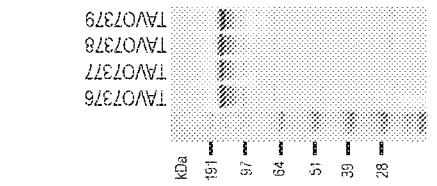
FIG. 5: SDS-PAGE analysis of four humanized anti-IL-1β IgG1 antibodies under (A) non-reduced and (B) reduced conditions.
Figure 5:
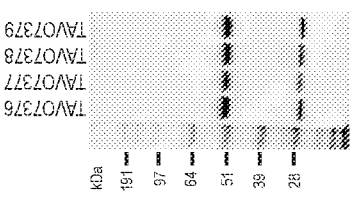

The purified TAVO7376, TAVO7377, TAVO7378 and TAVO7379 were subjected to SDS-PAGE analysis (FIG. 5). Under the reduced condition, all four antibodies had heavy chains and light chains with the expected molecular weight. Under the non-reduced condition, all four antibodies migrated as a major protein band with a molecular weight around 150 kDa.

Example 5: Binding to IL-1β by Humanized TAVO304

Figure 6:
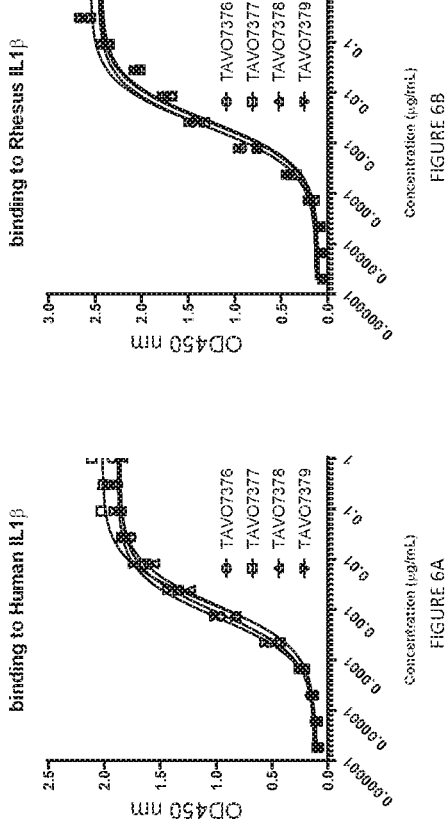
FIG. 6: Binding to (A) human and (B) rhesus IL-1β by four humanized anti-IL1b IgG1 antibodies.

ELISA-based binding assays were employed to evaluate humanized TAVO304 binding to recombinant human IL-1β. In this assay, 1 μg/ml recombinant human IL-1β (R&D systems) were coated on ELISA plate. Increasing concentrations of humanized TAVO304 antibodies were applied on the plate and their binding to the recombinant human IL-1β were detected by HRP-conjugated anti-mouse secondary antibody. It was observed that all four humanized antibodies TAVO7376, TAVO7377, TAVO7378 and TAVO7379, dose-dependently bound recombinant human IL-1β with similar potency and comparable to the mouse antibody TAVO304 (FIG. 6).

The binding of the four humanized antibodies on Rhesus monkey IL-1β were also evaluated in similar ELISA assay by coating the plate with Rhesus monkey IL-1β. All the four humanized antibodies TAVO7376, TAVO7377, TAVO7378 and TAVO7379, dose-dependently bound recombinant Rhesus IL-1β with similar potency (FIG. 6).

To evaluate the binding specificity, cytokines homologous to IL-1β such as IL-1α were evaluated for binding to humanized antibodies in ELISA-based binding assay with purified recombinant protein. All the four humanized antibodies TAVO7376, TAVO7377, TAVO7378 and TAVO7379 did not show significant binding to human IL-1α at 1 ug/mL in ELISA-based binding assay, indicating the specificity in IL-1β binding for the humanized antibodies.

To further measure the binding of humanized antibodies to immobilized recombinant IL-1β, surface plasmon resonance (SPR) binding assays will be performed using Biacore. This assay not only can measure binding affinities, but also kinetic rate constants and thermodynamics of binding.

Example 6: In Vitro Reporter Assay for IL-1β Neutralization by Humanized TAVO304

The HEK-Blue IL-1β reporter assay was employed to evaluate TAVO7376, TAVO7377, TAVO7378 and TAVO7379 in blocking human IL-1β driven reporter gene expression. Increasing amounts of antibodies along with 10 ng/mL human IL-1β were applied to HEK-Blue IL-1β reporter cells. After overnight incubation, the SEAP reporter gene expression was quantitated. It was observed that all the four humanized antibodies dose-dependently neutralized IL-1β-mediated reporter gene expression with similar potency (IC50 around 0.09 ug/mL, FIG. 7). Their potencies in neutralization human IL-1β is similar to that of TAVO304 and much potent than a reference antibody refAb-1.

The same assay was also employed to evaluate the four humanized antibodies in blocking rhesus monkey IL-1β driven reporter gene expression. Increasing amounts of antibodies along with 0.25 ng/mL rhesus monkey IL-1β were applied to HEK-Blue IL-1β reporter cells. It was observed that TAVO7376, TAVO7377, TAVO7378 and TAVO7379 antibodies dose-dependently neutralized rhesus monkey IL-1β-mediated reporter gene expression with similar potency (IC50 around 0.018 ug/mL, FIG. 7).

Example 7: In Vitro MRC-5 Cell Based Cytokine Release Assay for IL-1β Neutralization by Humanized TAVO304

Figure 8:
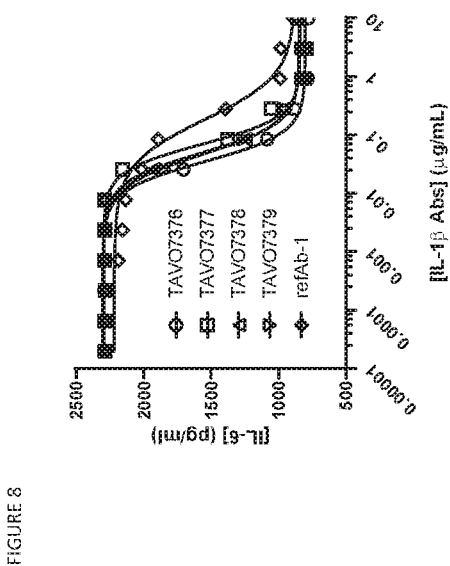
FIG. 8: Neutralizing human IL-1β driven IL-6 release from human lung fibroblast MRC-5 cells by four humanized anti-IL-1β IgG1 antibodies or a reference antibody refAb-1 (Canakinumab) in MRC-5 cytokine release assays.

IL-1β can drive the activation of human lung fibroblast cell line MRC-5 and stimulate IL-6 release. An in vitro assay was set up to measure the humanized TAVO304 antibodies in neutralizing IL-1β-mediated MRC-5 cell activation. Increasing amounts of antibodies along with 1 ng/mL human IL-1β were applied to MRC-5 cells (ATCC) for 24 hours, and the induced IL-6 release from the cells can be quantitated by IL-6 assay kit (R&D systems). It was observed that TAVO7376, TAVO7377, TAVO7378 and TAVO7379 antibodies dose-dependently blocked human IL-1β-mediated IL-6 release from MRC-5 cells with similar potency (IC50 around 50 ng/mL, FIG. 8), and more potent than a reference antibody refAb-1 in IL-1β inhibition.

Example 8: $F_c$ Engineering of Humanized Antibodies for Extended Half-Life, Reduced Effector Functions and Resistance to Proteolytic Degradation To improve the PK profile of humanized antibodies, $F_c$ mutations can be introduced to IgG1 antibody to extend antibody half-life. Specifically, M428L/N434S mutations have been demonstrated to extend antibody half-life by increasing FcRn binding affinity (Booth, Ramakrishnan et al. 2018). Furthermore, L234A/L235A Fc mutations can abolish the ADCC and CDC effector functions of IgG1 antibody (Hezareh, Hessell et al. 2001). Therefore, a humanized IgG1 heavy chain based on 304VH1 with L234A/L235A/M428L/N434S (AALS) mutations was generated comprise sequence set forth as SEQ ID NO. 31. By pairing this Fc-engineered 304VH1 heavy chain with humanized 304VL3 light chain set forth as SEQ ID NO. 17, a humanized TAVO304 antibody with extended half-life and reduced effector functions, were generated and designated as TAVO11878.

304VH1 Heavy Chain with AALS mutations
(SEQ ID NO: 31)
EVQLVESGGGLVQPGGSLRLSCAASGFTFSSFGMHWVRQAPGKGLEWVAY

ISIGSYTVHYADSVKGRFTISRDNAKNSLYLQMNSLRDEDTAVYYCVRDD

YDVTDYTMDYWGQGTTVTVSSASTKGPSVFPLAPSSKSTSGGTAALGCLV

KDYFPEPVTVSWNSGALTSGVHTFPAVLQSSGLYSLSSVVTVPSSSLGTQ

TYICNVNHKPSNTKVDKKVEPKSCDKTHTCPPCPAPEAAGGPSVFLFPPK

PKDTLMISRTPEVTCVVVDVSHEDPEVKFNWYVDGVEVHNAKTKPREEQY

NSTYRVVSVLTVLHQDWLNGKEYKCKVSNKALPAPIEKTISKAKGQPREP

QVYTLPPSREEMTKNQVSLTCLVKGFYPSDIAVEWESNGQPENNYKTTPP

VLDSDGSFFLYSKLTVDKSRWQQGNVFSCSVLHEALHSHYTQKSLSLSPG

K

The sequence of variable domain of heavy chain is underlined. The AALS mutations are bolded.

To study whether the Fc engineered antibody has improved FcRn binding affinity, the binding by TAVO11878 and TAVO7378 to mouse FcRn are assessed in ELISA-based binding assay. 1 ug/mL recombinant mouse FcRn (R&D systems) are coated on ELISA plate. Increasing concentrations of TAVO11878 and TAVO7378 antibodies are applied on the plate and their binding to the recombinant FcRn under pH 6.0 are detected by HRP-conjugated anti-mouse secondary antibody.

To study the PK profile of Fc engineered anti-IL-1β antibody, TAVO11878 and TAVO7378 are subjected to cynomolgus monkey PK model. Any effects of Fc engineering on improved PK profile relative to antibody with the native IgG₁ $F_c$ are evaluated.

To improve the in vivo stability of humanized antibodies, further Fc mutations can be introduced to IgG1 antibody to enhance the antibody resistance to proteolytic degradation. Many proteases may cleave the wild-type IgG antibody between or at residues 222-237 (EU numbering). The resistance to proteolytic degradation can be realized by engineering E233P mutation with G236 deleted, residue numbering according to the EU Index. Therefore, a humanized IgG1 heavy chain based on 304VH1 with E233P, L234A, L235A, M428L, N434S mutations with G236 deleted was generated and comprise sequence set forth as SEQ ID NO. 32. By pairing this Fc-engineered 304VH1 heavy chain with humanized 304VL3 light chain set forth as SEQ ID NO. 17, a humanized TAVO304 antibody with resistance to proteolytic degradation, extended half-life and reduced effector functions, were generated and designated as TAVO18378.

304VH1 Heavy Chain with E233P, L234A, L235A,
M428L, N434S mutations with G236 deleted
(SEQ ID NO: 32)
EVQLVESGGGLVQPGGSLRLSCAASGFTFSSFGMHWVRQAPGKGLEWVAY

ISIGSYTVHYADSVKGRFTISRDNAKNSLYLQMNSLRDEDTAVYYCVRDD

YDVTDYTMDYWGQGTTVTVSSASTKGPSVFPLAPSSKSTSGGTAALGCLV

KDYFPEPVTVSWNSGALTSGVHTFPAVLQSSGLYSLSSVVTVPSSSLGTQ

TYICNVNHKPSNTKVDKKVEPKSCDKTHTCPPCPAPPAAGPSVFLFPPKP

KDTLMISRTPEVTCVVVDVSHEDPEVKFNWYVDGVEVHNAKTKPREEQYN

STYRVVSVLTVLHQDWLNGKEYKCKVSNKALPAPIEKTISKAKGQPREPQ

VYTLPPSREEMTKNQVSLTCLVKGFYPSDIAVEWESNGQPENNYKTTPPV

LDSDGSFFLYSKLTVDKSRWQQGNVFSCSVLHEALHSHYTQKSLSLSPGK

The sequence of variable domain of heavy chain is underlined. The E233P, L234A, L235A, M428L, N434S mutations are bolded.

To study whether the anti-IL-1β antibody engineered with these Fc mutations has improved resistance to proteolytic degradation, TAVO18378 will be subjected to digestion by recombinant IgG protease IdeZ (New England Biolabs) at 37° C. for half an hour followed by SDS-PAGE analysis under reduced condition to assess the integrity of its heavy chain. Besides IgG protease IdeZ, TAVO18378 will also be subjected to digestion by recombinant Matrix Metalloproteinase 3, MMP3 (Enzo Life Sciences) at 37° C. for 24 hours followed by SDS-PAGE under reduced condition to assess the integrity of its heavy chain. It is expected that the above-mentioned $F_c$ mutations below the hinge region can facilitate the Fc-engineered anti-IL-1β antibody resistant to degradation by proteases including IdeZ and MMP3.

Example 9: In Vivo Efficacy of Humanized Anti-IL-1β Antibody on Arthritis

To study the in vivo efficacy of Fc engineered anti-IL-1β antibody, TAVO18378 will be evaluated in a mouse arthritis model. The mouse IL-1β receptor can be activated by human IL-1β, thus a mouse arthritis models can be used to evaluate the efficacy of antibody in blocking human IL-1β in vivo (Alten, Gram et al. 2008). NIH3T3 cell line stably expressing high level human IL-1β are established by transfection NIH3T3 cells with human IL-1β expression construct, and the high level expression cell clones are selected. The mouse joint inflammation model is set up by intra-articular injection of NIH3T3: hIL-1β cells into the right knee joints of DBA-1 mice. After dosing, the efficacy of antibody on the swelling of the joint, proteoglycan synthesis, and histopathology of the joint are evaluated.

REFERENCES

Alten, R., H. Gram, L. A. Joosten, W. B. van den Berg, J. Sieper, S. Wassenberg, G. Burmester, P. van Riel, M.

Diaz-Lorente, G. J. Bruin, T. G. Woodworth, C. Rordorf, Y. Batard, A. M. Wright and T. Jung (2008). "The human anti-IL-1β beta monoclonal antibody ACZ885 is effective in joint inflammation models in mice and in a proof-of-concept study in patients with rheumatoid arthritis." *Arthritis Res Ther* 10(3): R67.

Angal, S., D. J. King, M. W. Bodmer, A. Turner, A. D. Lawson, G. Roberts, B. Pedley and J. R. Adair (1993). "A single amino acid substitution abolishes the heterogeneity of chimeric mouse/human (IgG4) antibody." *Mol Immunol* 30(1): 105-108.

Bedu-Addo, F. K., C. Johnson, S. Jeyarajah, I. Henderson and S. J. Advant (2004). "Use of biophysical characterization in preformulation development of a heavy-chain fragment of botulinum serotype B: evaluation of suitable purification process conditions." *Pharm. Res.* 21: 1353-1361.

Bolt, S., E. Routledge, I. Lloyd, L. Chatenoud, H. Pope, S. D. Gorman, M. Clark and H. Waldmann (1993). "The generation of a humanized, non-mitogenic CD3 monoclonal antibody which retains in vitro immunosuppressive properties." *Eur J Immunol* 23(2): 403-411.

Booth, B. J., B. Ramakrishnan, K. Narayan, A. M. Wollacott, G. J. Babcock, Z. Shriver and K. Viswanathan (2018). "Extending human IgG half-life using structure-guided design." *MAbs* 10(7): 1098-1110.

Chu, S. Y., I. Vostiar, S. Karki, G. L. Moore, G. A. Lazar, E. Pong, P. F. Joyce, D. E. Szymkowski and J. R. Desjarlais (2008). "Inhibition of B cell receptor-mediated activation of primary human B cells by coengagement of CD19 and FcgammaRIIb with $F_c$-engineered antibodies." *Mol Immunol* 45(15): 3926-3933.

Dall'Acqua, W. F., P. A. Kiener and H. Wu (2006). "Properties of human IgGIs engineered for enhanced binding to the neonatal Fc receptor (FcRn)." *J Biol Chem* 281(33): 23514-23524.

Gram, H. (2016). "Preclinical characterization and clinical development of ILARIS((R)) (canakinumab) for the treatment of autoinflammatory diseases." *Curr Opin Chem Biol* 32: 1-9.

Gunasekaran, K., M. Pentony, M. Shen, L. Garrett, C. Forte, A. Woodward, S. B. Ng, T. Born, M. Retter, K. Manchulenko, H. Sweet, I. N. Foltz, M. Wittekind and W. Yan (2010). "Enhancing antibody $F_c$ heterodimer formation through electrostatic steering effects: applications to bispecific molecules and monovalent IgG." *J Biol Chem* 285(25): 19637-19646.

Gupta, S. and E. Kaisheva (2003). "Development of a multidose formulation for a humanized monoclonal antibody using experimental design techniques." *AAPS PharmSci.* 5E8: 2003.

Hezareh, M., A. J. Hessell, R. C. Jensen, J. G. van de Winkel and P. W. Parren (2001). "Effector function activities of a panel of mutants of a broadly neutralizing antibody against human immunodeficiency virus type 1." *J Virol* 75(24): 12161-12168.

Hinton, P. R., J. M. Xiong, M. G. Johlfs, M. T. Tang, S. Keller and N. Tsurushita (2006). "An engineered human IgG1 antibody with longer serum half-life." *J Immunol* 176(1): 346-356.

Issafras, H., J. A. Corbin, I. D. Goldfine and M. K. Roell (2013). "Detailed mechanistic analysis of gevokizumab, an allosteric anti-IL-1beta antibody with differential receptor-modulating properties." *J Pharmacol Exp Ther* 348(1): 202-215.

Kinder, M., A. R. Greenplate, K. D. Grugan, K. L. Soring, K. A. Heeringa, S. G. McCarthy, G. Bannish, M. Perpetua, F. Lynch, R. E. Jordan, W. R. Strohl and R. J. Brezski (2013). "Engineered protease-resistant antibodies with selectable cell-killing functions." *J Biol Chem* 288 (43): 30843-30854.

Knight, D. M., R. E. Jordan, M. Kruszynski, S. H. Tam, J. Giles-Komar, G. Treacy and G. A. Heavner (2004). "Pharmacodynamic enhancement of the anti-platelet antibody fab abciximab by site-specific pegylation." *Platelets* 15(7): 409-418.

Labrijn, A. F., A. O. Buijsse, E. T. van den Bremer, A. Y. Verwilligen, W. K. Bleeker, S. J. Thorpe, J. Killestein, C. H. Polman, R. C. Aalberse, J. Schuurman, J. G. van de Winkel and P. W. Parren (2009). "Therapeutic IgG4 antibodies engage in Fab-arm exchange with endogenous human IgG4 in vivo." *Nat Biotechnol* 27(8): 767-771.

Labrijn, A. F., J. I. Meesters, B. E. de Goeij, E. T. van den Bremer, J. Neijssen, M. D. van Kampen, K. Strumane, S. Verploegen, A. Kundu, M. J. Gramer, P. H. van Berkel, J. G. van de Winkel, J. Schuurman and P. W. Parren (2014). "Efficient generation of stable bispecific IgG1 by controlled Fab-arm exchange." *Proc Natl Acad Sci USA* 110(13): 5145-5150.

Leong, S. R., L. DeForge, L. Presta, T. Gonzalez, A. Fan, M. Reichert, A. Chuntharapai, K. J. Kim, D. B. Tumas, W. P. Lee, P. Gribling, B. Snedecor, H. Chen, V. Hsei, M. Schoenhoff, V. Hale, J. Deveney, I. Koumenis, Z. Shahrokh, P. McKay, W. Galan, B. Wagner, D. Narindray, C. Hebert and G. Zapata (2001). "Adapting pharmacokinetic properties of a humanized anti-interleukin-8 antibody for therapeutic applications using site-specific pegylation." *Cytokine* 16(3): 106-119.

Maa, Y. F. and C. C. Hsu (1996). "Aggregation of recombinant human growth hormone induced by phenolic compounds." *Int. J. Pharm.* 140: 155-168.

MacLennan, D. H., W. J. Rice, A. Odermatt and N. M. Green (1998). "Structure-function relationships in the Ca(2+)-binding and translocation domain of SERCA1: physiological correlates in Brody disease." *Acta Physiol Scand Suppl* 643: 55-67.

McCarty, S. and W. Frishman (2014). "Interleukin 1beta: a proinflammatory target for preventing atherosclerotic heart disease." *Cardiol Rev* 22(4): 176-181.

Owyang, A. M., H. Issafras, J. Corbin, K. Ahluwalia, P. Larsen, E. Pongo, M. Handa, A. H. Horwitz, M. K. Roell, M. Haak-Frendscho and L. Masat (2011). "XOMA 052, a potent, high-affinity monoclonal antibody for the treatment of IL-1beta-mediated diseases." *MAbs* 3(1): 49-60.

Petkova, S. B., S. Akilesh, T. J. Sproule, G. J. Christianson, H. Al Khabbaz, A. C. Brown, L. G. Presta, Y. G. Meng and D. C. Roopenian (2006). "Enhanced half-life of genetically engineered human IgG1 antibodies in a humanized FcRn mouse model: potential application in humorally mediated autoimmune disease." *Int Immunol* 18(12): 1759-1769.

Remmele, R. L. and W. R. Gombotz (2000). "Differential scanning calorimetry: A practical tool for elucidating stability of liquid biopharmaceuticals." *Biopharm.* 13: 36-46.

Remmele, R. L., N. S. Nightlinger, S. Srinivasan and W. R. Gombotz (1997). "Interleukin-1 receptor (IL-1R) liquid formulation development using differential scanning calorimetry." *Pharm. Res.* 15: 200-208.

Ridgway, J. B., L. G. Presta and P. Carter (1996). "'Knobs-into-holes' engineering of antibody CH3 domains for heavy chain heterodimerization." *Protein Eng* 9(7): 617-621.

Sasaki, N. and K. Sutoh (1998). "Structure-mutation analysis of the ATPase site of Dictyostelium discoideum myosin II." *Adv Biophys* 35: 1-24.

Shields, R. L., A. K. Namenuk, K. Hong, Y. G. Meng, J. Rae, J. Briggs, D. Xie, J. Lai, A. Stadlen, B. Li, J. A. Fox and L. G. Presta (2001). "High resolution mapping of the binding site on human IgG1 for Fc gamma RI, Fc gamma RII, Fc gamma RIII, and FcRn and design of IgG1 variants with improved binding to the Fc gamma R." *J Biol Chem* 276(9): 6591-6604.

Vafa, O., G. L. Gilliland, R. J. Brezski, B. Strake, T. Wilkinson, E. R. Lacy, B. Scallon, A. Teplyakov, T. J. Malia and W. R. Strohl (2014). "An engineered Fc variant of an IgG eliminates all immune effector functions via structural perturbations." *Methods* 65(1): 114-126.

Worn, A. and A. Pluckthun (2001). "Stability engineering of antibody single-chain Fv fragments." *J Mol Biol* 305(5): 989-1010.

Xu, D., M. L. Alegre, S. S. Varga, A. L. Rothermel, A. M. Collins, V. L. Pulito, L. S. Hanna, K. P. Dolan, P. W. Parren, J. A. Bluestone, L. K. Jolliffe and R. A. Zivin (2000). "In vitro characterization of five humanized OKT3 effector function variant antibodies." *Cell Immunol* 200(1): 16-26.

Yang, K., A. Basu, M. Wang, R. Chintala, M. C. Hsieh, S. Liu, J. Hua, Z. Zhang, J. Zhou, M. Li, H. Phyu, G. Petti, M. Mendez, H. Janjua, P. Peng, C. Longley, V. Borowski, M. Mehlig and D. Filpula (2003). "Tailoring structure-function and pharmacokinetic properties of single-chain Fv proteins by site-specific PEGylation." *Protein Eng* 16(10): 761-770.

Yates, Z., K. Gunasekaran, H. Zhou, Z. Hu, Z. Liu, R. R. Ketchem and B. Yan (2010). "Histidine residue mediates radical-induced hinge cleavage of human IgG1." *J Biol Chem* 285(24): 18662-18671.

Zalevsky, J., A. K. Chamberlain, H. M. Horton, S. Karki, I. W. Leung, T. J. Sproule, G. A. Lazar, D. C. Roopenian and J. R. Desjarlais (2010). "Enhanced antibody half-life improves in vivo activity." *Nat Biotechnol* 28(2): 157-159.

Zhang, Y., S. Roy, L. S. Jones, S. Krishnan, B. A. Kerwin, B. S. Chang, M. C. Manning, T. W. Randolph and J. F. Carpenter (2004). "Mechanism for benzyl alcohol-induced aggregation of recombinant human interleukin-1 receptor antagonist in aqueous solution." *J. Pharm. Sci.* 93: 3076-3089.

All references cited herein, including the entire disclosures of these references/publications, and all patents, patent application publications and books referred to herein, are hereby incorporated by reference in their entirety into the subject application.

We claim:

1. An isolated antibody or an antigen-binding fragment thereof that specifically binds to IL-1β and neutralizes, inhibits, blocks, abrogates, reduces, or interferes with an activity of IL-1β;
    wherein the antibody or antigen-binding fragment comprises heavy chain complementarity determining region (CDR) sequences HCDR1, HCDR2, and HCDR3 set forth as SEQ ID NO: 3, SEQ ID NO: 4, and SEQ ID NO: 5, respectively, and
    wherein the antibody or antigen-binding fragment comprises light chain complementarity determining region (CDR) sequences LCDR1, LCDR2, LCDR3 set forth as SEQ ID NO: 6, SEQ ID NO: 7, and SEQ ID NO: 8, respectively.

2. The antibody or antigen-binding fragment of claim 1, wherein the antibody or antigen-binding fragment is a humanized antibody or antigen-binding fragment.

3. The antibody or antigen-binding fragment of claim 2, wherein the antibody or antigen-binding fragment comprises a heavy chain variable region set forth as SEQ ID NO: 9.

4. The antibody or antigen-binding fragment of claim 2, wherein the antibody or antigen-binding fragment comprises a light chain variable region set forth as SEQ ID NO: 10.

5. The antibody or antigen-binding fragment of claim 2, wherein the antibody or antigen-binding fragment comprises a light chain variable region set forth as SEQ ID NO: 11.

6. The antibody or antigen-binding fragment of claim 2, wherein the antibody or antigen-binding fragment comprises a light chain variable region set forth as SEQ ID NO: 12.

7. The antibody or antigen-binding fragment of claim 2, wherein the antibody or antigen-binding fragment comprises a light chain variable region set forth as SEQ ID NO: 13.

8. The antibody or antigen-binding fragment of claim 2, wherein the antibody or antigen-binding fragment comprises a human IgG$_1$ heavy chain sequence set forth as SEQ ID NO: 14.

9. The antibody or antigen-binding fragment of claim 2, wherein the antibody or antigen-binding fragment comprises a human light chain sequence set forth as SEQ ID NO: 15.

10. The antibody or antigen-binding fragment of claim 2, wherein the antibody or antigen-binding fragment comprises a human light chain sequence set forth as SEQ ID NO: 16.

11. The antibody or antigen-binding fragment of claim 2, wherein the antibody or antigen-binding fragment comprises a human light chain sequence set forth as SEQ ID NO: 17.

12. The antibody or antigen-binding fragment of claim 2, wherein the antibody or antigen-binding fragment comprises a human light chain sequence set forth as SEQ ID NO: 18.

13. The antibody or antigen-binding fragment of claim 1, wherein the antibody is an IgG$_1$, IgG$_2$, IgG$_3$, or IgG$_4$ isotype.

14. The antibody or antigen-binding fragment of claim 1, wherein the antibody has L234A, L235A, M428L, and N434S F$_c$ mutations that extend the half-life of the mutated antibody and reduce the effector functions of the mutated antibody, residue numbering according to the EU Index, as compared to the parental wild-type antibody.

15. The antibody or antigen-binding fragment of claim 2, wherein the humanized antibody or antigen-binding fragment comprises a human IgG$_1$ heavy chain set forth as SEQ ID NO: 31.

16. The antibody or antigen-binding fragment of claim 1, wherein the antibody has E233P, L234A, L235A, F405L, M428L, and N434S Fc mutations and has G236 deleted to enhance resistance of the mutated antibody to proteolytic degradation, extend the half-life of the mutated antibody, and reduce the effector functions of the mutated antibody, residue numbering according to the EU Index, as compared to the parental wild-type antibody.

17. The antibody or antigen-binding fragment of claim 2, wherein the antibody or antigen-binding fragment comprises a human IgG$_1$ heavy chain set forth as SEQ ID NO: 32.

18. The antibody or antigen-binding fragment of claim 1, wherein the antibody or antigen-binding fragment blocks the binding of monkey IL-1β to its receptor IL-1RI.

19. The antibody or antigen-binding fragment of claim 1, wherein the antibody or fragment inhibits IL-1β-driven IL-6 release from human fibroblast cell MRC-5 in a cytokine release assay.

* * * * *

SEQUENCE LISTING

```
<160> NUMBER OF SEQ ID NOS: 34

<210> SEQ ID NO 1
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Asp Val Gln Leu Val Glu Ser Gly Gly Gly Leu Val Gln Pro Gly Gly
1               5                   10                  15

Ser Arg Lys Leu Ser Cys Ala Ala Ser Gly Phe Thr Phe Ser Ser Phe
            20                  25                  30

Gly Met His Trp Val Arg Gln Ala Pro Glu Lys Gly Leu Glu Trp Val
        35                  40                  45

Ala Tyr Ile Ser Ile Gly Ser Tyr Thr Val His Tyr Ala Asp Thr Val
    50                  55                  60

Lys Gly Arg Phe Thr Ile Ser Arg Asp Asn Pro Lys Asn Thr Leu Phe
65                  70                  75                  80

Leu Gln Met Thr Ser Leu Arg Ser Glu Asp Thr Ala Met Tyr Tyr Cys
                85                  90                  95

Val Arg Asp Asp Tyr Asp Val Thr Asp Tyr Thr Met Asp Tyr Trp Gly
            100                 105                 110

Gln Gly Thr Ser Val Thr Val Ser Ser
        115                 120

<210> SEQ ID NO 2
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide
```

-continued

```
<400> SEQUENCE: 2

Asp Ile Val Met Ser Gln Ser Pro Ser Ser Leu Ala Val Ser Thr Gly
1               5                   10                  15

Glu Lys Val Thr Met Ser Cys Lys Ser Ser Gln Ser Leu Leu Asn Ser
                20                  25                  30

Arg Thr Arg Lys Asn Tyr Leu Ala Trp Tyr Gln Gln Lys Pro Gly Gln
            35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Gly Ser Val Gln Ala Glu Asp Leu Ala Val Tyr Tyr Cys Lys Gln
                85                  90                  95

Thr Tyr Asn Phe Pro Thr Phe Gly Gly Gly Thr Lys Leu Glu Ile Lys
                100                 105                 110

<210> SEQ ID NO 3
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Gly Phe Thr Phe Ser Ser Phe Gly Met His
1               5                   10

<210> SEQ ID NO 4
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Tyr Ile Ser Ile Gly Ser Tyr Thr Val His
1               5                   10

<210> SEQ ID NO 5
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Asp Asp Tyr Asp Val Thr Asp Tyr Thr Met Asp Tyr
1               5                   10

<210> SEQ ID NO 6
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Lys Ser Ser Gln Ser Leu Leu Asn Ser Arg Thr Arg Lys Asn Tyr Leu
1               5                   10                  15
```

Ala

```
<210> SEQ ID NO 7
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Trp Ala Ser Thr Arg Glu Ser
1               5

<210> SEQ ID NO 8
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Lys Gln Thr Tyr Asn Phe Pro Thr
1               5

<210> SEQ ID NO 9
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Phe
            20                  25                  30

Gly Met His Trp Val Arg Gln Ala Pro Gly Lys Gly Leu Glu Trp Val
        35                  40                  45

Ala Tyr Ile Ser Ile Gly Ser Tyr Thr Val His Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Val Arg Asp Asp Tyr Asp Val Thr Asp Tyr Thr Met Asp Tyr Trp Gly
            100                 105                 110

Gln Gly Thr Thr Val Thr Val Ser Ser
        115                 120

<210> SEQ ID NO 10
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Asp Ile Gln Met Thr Gln Ser Pro Ser Ser Leu Ser Ala Ser Val Gly
1               5                   10                  15
```

```
Asp Arg Val Thr Ile Thr Cys Lys Ser Ser Gln Ser Leu Leu Asn Ser
            20                  25                  30

Arg Thr Arg Lys Asn Tyr Leu Ala Trp Tyr Gln Gln Lys Pro Gly Lys
        35                  40                  45

Ala Pro Lys Leu Leu Ile Tyr Trp Ala Ser Thr Arg Glu Ser Gly Val
    50                  55                  60

Pro Ser Arg Phe Ser Gly Ser Gly Ser Gly Thr Asp Phe Thr Leu Thr
65                  70                  75                  80

Ile Ser Ser Leu Gln Pro Glu Asp Phe Ala Thr Tyr Tyr Cys Lys Gln
                85                  90                  95

Thr Tyr Asn Phe Pro Thr Phe Gly Gln Gly Thr Lys Leu Glu Ile Lys
            100                 105                 110

<210> SEQ ID NO 11
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 11

Asp Ile Gln Met Thr Gln Ser Pro Ser Ser Leu Ser Ala Ser Val Gly
1               5                   10                  15

Asp Arg Val Thr Met Thr Cys Lys Ser Ser Gln Ser Leu Leu Asn Ser
            20                  25                  30

Arg Thr Arg Lys Asn Tyr Leu Ala Trp Tyr Gln Gln Lys Pro Gly Lys
        35                  40                  45

Ala Pro Lys Leu Leu Ile Tyr Trp Ala Ser Thr Arg Glu Ser Gly Val
    50                  55                  60

Pro Ser Arg Phe Ser Gly Ser Gly Ser Gly Thr Asp Phe Thr Leu Thr
65                  70                  75                  80

Ile Ser Ser Val Gln Pro Glu Asp Leu Ala Thr Tyr Tyr Cys Lys Gln
                85                  90                  95

Thr Tyr Asn Phe Pro Thr Phe Gly Gln Gly Thr Lys Leu Glu Ile Lys
            100                 105                 110

<210> SEQ ID NO 12
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 12

Asp Ile Val Met Thr Gln Thr Pro Leu Ser Leu Pro Val Thr Pro Gly
1               5                   10                  15

Glu Pro Ala Ser Ile Ser Cys Lys Ser Ser Gln Ser Leu Leu Asn Ser
            20                  25                  30

Arg Thr Arg Lys Asn Tyr Leu Ala Trp Tyr Leu Gln Lys Pro Gly Gln
        35                  40                  45

Ser Pro Gln Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Lys
65                  70                  75                  80

Ile Ser Arg Val Glu Ala Glu Asp Val Gly Val Tyr Tyr Cys Lys Gln
                85                  90                  95
```

Thr Tyr Asn Phe Pro Thr Phe Gly Gln Gly Thr Lys Leu Glu Ile Lys
            100                 105                 110

<210> SEQ ID NO 13
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 13

Asp Ile Val Met Thr Gln Thr Pro Leu Ser Leu Pro Val Thr Pro Gly
1               5                   10                  15

Glu Pro Val Ser Met Ser Cys Lys Ser Ser Gln Ser Leu Leu Asn Ser
            20                  25                  30

Arg Thr Arg Lys Asn Tyr Leu Ala Trp Tyr Leu Gln Lys Pro Gly Gln
        35                  40                  45

Ser Pro Gln Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Lys
65                  70                  75                  80

Ile Ser Arg Val Glu Ala Glu Asp Val Gly Val Tyr Tyr Cys Lys Gln
                85                  90                  95

Thr Tyr Asn Phe Pro Thr Phe Gly Gln Gly Thr Lys Leu Glu Ile Lys
            100                 105                 110

<210> SEQ ID NO 14
<211> LENGTH: 451
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 14

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Phe
            20                  25                  30

Gly Met His Trp Val Arg Gln Ala Pro Gly Lys Gly Leu Glu Trp Val
        35                  40                  45

Ala Tyr Ile Ser Ile Gly Ser Tyr Thr Val His Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Val Arg Asp Asp Tyr Asp Val Thr Asp Tyr Thr Met Asp Tyr Trp Gly
            100                 105                 110

Gln Gly Thr Thr Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
            195                 200                 205

Lys Pro Ser Asn Thr Lys Val Asp Lys Lys Val Glu Pro Lys Ser Cys
            210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
            275                 280                 285

His Asn Ala Lys Thr Lys Pro Arg Glu Glu Gln Tyr Asn Ser Thr Tyr
            290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
            325                 330                 335

Glu Lys Thr Ile Ser Lys Ala Lys Gly Gln Pro Arg Glu Pro Gln Val
            340                 345                 350

Tyr Thr Leu Pro Pro Ser Arg Glu Glu Met Thr Lys Asn Gln Val Ser
            355                 360                 365

Leu Thr Cys Leu Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Arg Leu Thr Val
            405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
            435                 440                 445

Pro Gly Lys
    450

<210> SEQ ID NO 15
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Asp Ile Gln Met Thr Gln Ser Pro Ser Ser Leu Ser Ala Ser Val Gly
1               5                   10                  15

Asp Arg Val Thr Ile Thr Cys Lys Ser Ser Gln Ser Leu Leu Asn Ser
            20                  25                  30

Arg Thr Arg Lys Asn Tyr Leu Ala Trp Tyr Gln Gln Lys Pro Gly Lys
        35                  40                  45

Ala Pro Lys Leu Leu Ile Tyr Trp Ala Ser Thr Arg Glu Ser Gly Val
    50                  55                  60

Pro Ser Arg Phe Ser Gly Ser Gly Ser Gly Thr Asp Phe Thr Leu Thr
65                  70                  75                  80

```
Ile Ser Ser Leu Gln Pro Glu Asp Phe Ala Thr Tyr Tyr Cys Lys Gln
                85                  90                  95

Thr Tyr Asn Phe Pro Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215
```

<210> SEQ ID NO 16
<211> LENGTH: 219
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 16

```
Asp Ile Gln Met Thr Gln Ser Pro Ser Ser Leu Ser Ala Ser Val Gly
1               5                   10                  15

Asp Arg Val Thr Met Thr Cys Lys Ser Ser Gln Ser Leu Leu Asn Ser
            20                  25                  30

Arg Thr Arg Lys Asn Tyr Leu Ala Trp Tyr Gln Lys Pro Gly Lys
        35                  40                  45

Ala Pro Lys Leu Leu Ile Tyr Trp Ala Ser Thr Arg Glu Ser Gly Val
    50                  55                  60

Pro Ser Arg Phe Ser Gly Ser Gly Ser Gly Thr Asp Phe Thr Leu Thr
65                  70                  75                  80

Ile Ser Ser Val Gln Pro Glu Asp Leu Ala Thr Tyr Tyr Cys Lys Gln
                85                  90                  95

Thr Tyr Asn Phe Pro Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
```

<210> SEQ ID NO 17
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Asp Ile Val Met Thr Gln Thr Pro Leu Ser Leu Pro Val Thr Pro Gly
1               5                   10                  15

Glu Pro Ala Ser Ile Ser Cys Lys Ser Ser Gln Ser Leu Leu Asn Ser
            20                  25                  30

Arg Thr Arg Lys Asn Tyr Leu Ala Trp Tyr Leu Gln Lys Pro Gly Gln
        35                  40                  45

Ser Pro Gln Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Lys
65                  70                  75                  80

Ile Ser Arg Val Glu Ala Glu Asp Val Gly Val Tyr Tyr Cys Lys Gln
                85                  90                  95

Thr Tyr Asn Phe Pro Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 18
<211> LENGTH: 219
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Asp Ile Val Met Thr Gln Thr Pro Leu Ser Leu Pro Val Thr Pro Gly
1               5                   10                  15

Glu Pro Val Ser Met Ser Cys Lys Ser Ser Gln Ser Leu Leu Asn Ser
            20                  25                  30

Arg Thr Arg Lys Asn Tyr Leu Ala Trp Tyr Leu Gln Lys Pro Gly Gln
        35                  40                  45

Ser Pro Gln Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Lys

```
             65                  70                  75                  80
Ile Ser Arg Val Glu Ala Glu Asp Val Gly Val Tyr Tyr Cys Lys Gln
                     85                  90                  95

Thr Tyr Asn Phe Pro Thr Phe Gly Gln Gly Thr Lys Leu Glu Ile Lys
                100                 105                 110

Arg Thr Val Ala Ala Pro Ser Val Phe Ile Phe Pro Pro Ser Asp Glu
                115                 120                 125

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
                180                 185                 190

Lys His Lys Val Tyr Ala Cys Glu Val Thr His Gln Gly Leu Ser Ser
                195                 200                 205

Pro Val Thr Lys Ser Phe Asn Arg Gly Glu Cys
210                 215

<210> SEQ ID NO 19
<211> LENGTH: 234
<212> TYPE: PRT
<213> ORGANISM: Unknown
<220> FEATURE:
<223> OTHER INFORMATION: Description of Unknown:
      IgG1 Fc sequence

<400> SEQUENCE: 19

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
                20                  25                  30

Lys Pro Lys Asp Thr Leu Met Ile Ser Arg Thr Pro Glu Val Thr Cys
                35                  40                  45

Val Val Val Asp Val Ser His Glu Asp Pro Glu Val Lys Phe Asn Trp
50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn
                100                 105                 110

Lys Ala Leu Pro Ala Pro Ile Glu Lys Thr Ile Ser Lys Ala Lys Gly
                115                 120                 125

Gln Pro Arg Glu Pro Gln Val Tyr Thr Leu Pro Pro Ser Arg Asp Glu
130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
                180                 185                 190

Leu Tyr Ser Lys Leu Thr Val Asp Lys Ser Arg Trp Gln Gln Gly Asn
                195                 200                 205
```

```
Val Phe Ser Cys Ser Val Met His Glu Ala Leu His Asn His Tyr Thr
        210                 215                 220
Gln Lys Ser Leu Ser Leu Ser Pro Gly Lys
225                 230

<210> SEQ ID NO 20
<211> LENGTH: 230
<212> TYPE: PRT
<213> ORGANISM: Unknown
<220> FEATURE:
<223> OTHER INFORMATION: Description of Unknown:
      IgG2 Fc sequence

<400> SEQUENCE: 20

Thr Val Glu Arg Lys Cys Cys Val Glu Cys Pro Pro Cys Pro Ala Pro
1               5                   10                  15
Pro Val Ala Gly Pro Ser Val Phe Leu Phe Pro Pro Lys Pro Lys Asp
            20                  25                  30
Thr Leu Met Ile Ser Arg Thr Pro Glu Val Thr Cys Val Val Val Asp
        35                  40                  45
Val Ser His Glu Asp Pro Glu Val Gln Phe Asn Trp Tyr Val Asp Gly
50                  55                  60
Val Glu Val His Asn Ala Lys Thr Lys Pro Arg Glu Glu Gln Phe Asn
65                  70                  75                  80
Ser Thr Phe Arg Val Val Ser Val Leu Thr Val Val His Gln Asp Trp
                85                  90                  95
Leu Asn Gly Lys Glu Tyr Lys Cys Lys Val Ser Asn Lys Gly Leu Pro
            100                 105                 110
Ala Pro Ile Glu Lys Thr Ile Ser Lys Thr Lys Gly Gln Pro Arg Glu
        115                 120                 125
Pro Gln Val Tyr Thr Leu Pro Pro Ser Arg Glu Glu Met Thr Lys Asn
    130                 135                 140
Gln Val Ser Leu Thr Cys Leu Val Lys Gly Phe Tyr Pro Ser Asp Ile
145                 150                 155                 160
Ala Val Glu Trp Glu Ser Asn Gly Gln Pro Glu Asn Asn Tyr Lys Thr
                165                 170                 175
Thr Pro Pro Met Leu Asp Ser Asp Gly Ser Phe Phe Leu Tyr Ser Lys
            180                 185                 190
Leu Thr Val Asp Lys Ser Arg Trp Gln Gln Gly Asn Val Phe Ser Cys
        195                 200                 205
Ser Val Met His Glu Ala Leu His Asn His Tyr Thr Gln Lys Ser Leu
    210                 215                 220
Ser Leu Ser Pro Gly Lys
225                 230

<210> SEQ ID NO 21
<211> LENGTH: 236
<212> TYPE: PRT
<213> ORGANISM: Unknown
<220> FEATURE:
<223> OTHER INFORMATION: Description of Unknown:
      IgG3 Fc sequence

<400> SEQUENCE: 21

Arg Val Glu Leu Lys Thr Pro Leu Gly Asp Thr Thr His Thr Cys Pro
1               5                   10                  15
Pro Cys Pro Ala Pro Glu Leu Leu Gly Gly Pro Ser Val Phe Leu Phe
            20                  25                  30
```

-continued

```
Pro Pro Lys Pro Lys Asp Thr Leu Met Ile Ser Arg Thr Pro Glu Val
        35                  40                  45

Thr Cys Val Val Val Asp Val Ser His Glu Asp Pro Glu Val Lys Phe
 50                  55                  60

Asn Trp Tyr Val Asp Gly Val Glu Val His Asn Ala Lys Thr Lys Pro
 65                  70                  75                  80

Arg Glu Glu Gln Tyr Asn Ser Thr Tyr Arg Val Val Ser Val Leu Thr
                 85                  90                  95

Val Leu His Gln Asp Trp Leu Asn Gly Lys Glu Tyr Lys Cys Lys Val
            100                 105                 110

Ser Asn Lys Ala Leu Pro Ala Pro Ile Glu Lys Thr Ile Ser Lys Ala
        115                 120                 125

Lys Gly Gln Pro Arg Glu Pro Gln Val Tyr Thr Leu Pro Pro Ser Arg
130                 135                 140

Asp Glu Leu Thr Lys Asn Gln Val Ser Leu Thr Cys Leu Val Lys Gly
145                 150                 155                 160

Phe Tyr Pro Ser Asp Ile Ala Val Glu Trp Glu Ser Asn Gly Gln Pro
                165                 170                 175

Glu Asn Asn Tyr Lys Thr Thr Pro Pro Val Leu Asp Ser Asp Gly Ser
            180                 185                 190

Phe Phe Leu Tyr Ser Lys Leu Thr Val Asp Lys Ser Arg Trp Gln Gln
        195                 200                 205

Gly Asn Val Phe Ser Cys Ser Val Met His Glu Ala Leu His Asn His
210                 215                 220

Tyr Thr Gln Lys Ser Leu Ser Leu Ser Pro Gly Lys
225                 230                 235

<210> SEQ ID NO 22
<211> LENGTH: 231
<212> TYPE: PRT
<213> ORGANISM: Unknown
<220> FEATURE:
<223> OTHER INFORMATION: Description of Unknown:
      IgG4 Fc sequence

<400> SEQUENCE: 22

Arg Val Glu Ser Lys Tyr Gly Pro Pro Cys Pro Ser Cys Pro Ala Pro
1                5                  10                  15

Glu Phe Leu Gly Gly Pro Ser Val Phe Leu Phe Pro Pro Lys Pro Lys
            20                  25                  30

Asp Thr Leu Met Ile Ser Arg Thr Pro Glu Val Thr Cys Val Val Val
        35                  40                  45

Asp Val Ser Gln Glu Asp Pro Glu Val Gln Phe Asn Trp Tyr Val Asp
 50                  55                  60

Gly Val Glu Val His Asn Ala Lys Thr Lys Pro Arg Glu Glu Gln Phe
 65                  70                  75                  80

Asn Ser Thr Tyr Arg Val Val Ser Val Leu Thr Val Leu His Gln Asp
                 85                  90                  95

Trp Leu Asn Gly Lys Glu Tyr Lys Cys Lys Val Ser Asn Lys Gly Leu
            100                 105                 110

Pro Ser Ser Ile Glu Lys Thr Ile Ser Lys Ala Lys Gly Gln Pro Arg
        115                 120                 125

Glu Pro Gln Val Tyr Thr Leu Pro Pro Ser Gln Glu Glu Met Thr Lys
130                 135                 140

Asn Gln Val Ser Leu Thr Cys Leu Val Lys Gly Phe Tyr Pro Ser Asp
145                 150                 155                 160
```

```
Ile Ala Val Glu Trp Glu Ser Asn Gly Gln Pro Glu Asn Asn Tyr Lys
                165                 170                 175

Thr Thr Pro Pro Val Leu Asp Ser Asp Gly Ser Phe Phe Leu Tyr Ser
            180                 185                 190

Arg Leu Thr Val Asp Lys Ser Arg Trp Gln Glu Gly Asn Val Phe Ser
        195                 200                 205

Cys Ser Val Met His Glu Ala Leu His Asn His Tyr Thr Gln Lys Ser
    210                 215                 220

Leu Ser Leu Ser Leu Gly Lys
225                 230

<210> SEQ ID NO 23
<211> LENGTH: 234
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Thr Leu Tyr Ile Thr Arg Glu Pro Glu Val Thr Cys
        35                  40                  45

Val Val Val Asp Val Ser His Glu Asp Pro Glu Val Lys Phe Asn Trp
    50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Met His Glu Ala Leu His Asn His Tyr Thr
    210                 215                 220

Gln Lys Ser Leu Ser Leu Ser Pro Gly Lys
225                 230

<210> SEQ ID NO 24
<211> LENGTH: 234
<212> TYPE: PRT
<213> ORGANISM: Artificial Sequence
<220> FEATURE:
<223> OTHER INFORMATION: Description of Artificial Sequence: Synthetic
``` polypeptide

<400> SEQUENCE: 24

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Thr Leu Met Ile Ser Arg Thr Pro Glu Val Thr Cys
        35                  40                  45

Val Val Val Asp Val Ser His Glu Asp Pro Glu Val Lys Phe Asn Trp
    50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Leu His Glu Ala Leu His Ser His Tyr Thr
    210                 215                 220

Gln Lys Ser Leu Ser Leu Ser Pro Gly Lys
225                 230

<210> SEQ ID NO 25
<211> LENGTH: 234
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Gln Leu Met Ile Ser Arg Thr Pro Glu Val Thr Cys
        35                  40                  45

Val Val Val Asp Val Ser His Glu Asp Pro Glu Val Lys Phe Asn Trp
    50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn

Lys Ala Leu Pro Ala Pro Ile Glu Lys Thr Ile Ser Lys Ala Lys Gly
            115                 120                 125

Gln Pro Arg Glu Pro Gln Val Tyr Thr Leu Pro Pro Ser Arg Asp Glu
        130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Leu His Glu Ala Leu His Asn His Tyr Thr
210                 215                 220

Gln Lys Ser Leu Ser Leu Ser Pro Gly Lys
225                 230

<210> SEQ ID NO 26
<211> LENGTH: 234
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
                20                  25                  30

Lys Pro Lys Asp Thr Leu Met Ile Ser Arg Thr Pro Glu Val Thr Cys
            35                  40                  45

Val Val Val Asp Val Ser His Glu Asp Pro Glu Val Lys Phe Asn Trp
        50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Met His Glu Ala Leu His Ala His Tyr Thr
210                 215                 220

Gln Lys Ser Leu Ser Leu Ser Pro Gly Lys
225                 230

<210> SEQ ID NO 27
<211> LENGTH: 234
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
                20                  25                  30

Lys Pro Lys Asp Thr Leu Met Ile Ser Arg Thr Pro Glu Val Thr Cys
            35                  40                  45

Val Val Val Asp Val Ser His Glu Asp Pro Glu Val Lys Phe Asn Trp
50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Ala Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Ala Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Met His Glu Ala Leu His Ala His Tyr Thr
    210                 215                 220

Gln Lys Ser Leu Ser Leu Ser Pro Gly Lys
225                 230

<210> SEQ ID NO 28
<211> LENGTH: 233
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 28

Lys Val Glu Pro Lys Ser Cys Asp Lys Thr His Thr Cys Pro Pro Cys
1               5                   10                  15

Pro Ala Pro Pro Val Ala Gly Pro Ser Val Phe Leu Phe Pro Pro Lys
                20                  25                  30

Pro Lys Asp Thr Leu Met Ile Ser Arg Thr Pro Glu Val Thr Cys Val
            35                  40                  45

Val Val Asp Val Ser His Glu Asp Pro Glu Val Lys Phe Asn Trp Tyr
 50                  55                  60

Val Asp Gly Val Glu Val His Asn Ala Lys Thr Lys Pro Arg Glu Glu
 65                  70                  75                  80

Gln Tyr Asn Ser Thr Tyr Arg Val Val Ser Val Leu Thr Val Leu His
                 85                  90                  95

Gln Asp Trp Leu Asn Gly Lys Glu Tyr Lys Cys Lys Val Ser Asn Lys
            100                 105                 110

Ala Leu Pro Ala Pro Ile Glu Lys Thr Ile Ser Lys Ala Lys Gly Gln
        115                 120                 125

Pro Arg Glu Pro Gln Val Tyr Thr Leu Pro Pro Ser Arg Asp Glu Leu
130                 135                 140

Thr Lys Asn Gln Val Ser Leu Thr Cys Leu Val Lys Gly Phe Tyr Pro
145                 150                 155                 160

Ser Asp Ile Ala Val Glu Trp Glu Ser Asn Gly Gln Pro Glu Asn Asn
                165                 170                 175

Tyr Lys Thr Thr Pro Pro Val Leu Asp Ser Asp Gly Ser Phe Phe Leu
            180                 185                 190

Tyr Ser Lys Leu Thr Val Asp Lys Ser Arg Trp Gln Gln Gly Asn Val
        195                 200                 205

Phe Ser Cys Ser Val Met His Glu Ala Leu His Asn His Tyr Thr Gln
210                 215                 220

Lys Ser Leu Ser Leu Ser Pro Gly Lys
225                 230

```
<210> SEQ ID NO 29
<211> LENGTH: 1359
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 29
caggccgagg tgcagctggt ggagtccgga ggaggactgg tgcagcccgg cggctctctg        60
agactgagct gcgctgcctc cggattcacc ttcagcagct tcggcatgca ctgggtgaga       120 caagccccg  gcaagggact ggagtgggtg gcctatatca gcatcggcag ctacacagtg       180
cactacgccg actccgtgaa aggaagattc accatttcta gagacaacgc caagaactct       240
ctgtatctgc agatgaactc tctgagggac gaagataccg ccgtgtacta ctgcgtgagg       300
gacgactacg acgtgaccga ctacaccatg gactactggg gccaaggcac caccgtgaca       360
gtgagcagcg ccagcaccaa gggcccatcg gtcttccccc tggcaccctc ctccaagagc       420
acctctgggg gcacagcggc cctgggctgc ctggtcaagg actacttccc cgaaccggtg       480
acggtgtcgt ggaactcagg cgccctgacc agcggcgtgc acaccttccc ggctgtccta       540
cagtcctcag gactctactc cctcagcagc gtggtgaccg tgccctccag cagcttgggc       600
acccagacct acatctgcaa cgtgaatcac aagcccagca caccaaggt  ggacaagaaa       660 gttgagccca atcttgtga  caaaactcac acatgcccac cgtgcccagc acctgaactc       720
ctggggggac cgtcagtctt cctcttcccc ccaaaaccca aggacaccct catgatctcc       780
cggacccctg aggtcacatg cgtggtggtg gacgtgagcc acgaagaccc tgaggtcaag       840
ttcaactggt acgtggacgg cgtggaggtg cataatgcca agacaaagcc gcgggaggag       900
cagtacaaca gcacgtaccg tgtggtcagc gtcctcaccg tcctgcacca ggactggctg       960
```

| | |
|---|---|
| aatggcaagg agtacaagtg caaggtctcc aacaaagccc tcccagcccc catcgagaaa | 1020 |
| accatctcca agccaaagg gcagccccga gaaccacagg tgtacaccct gcccccatcc | 1080 |
| cgggaggaga tgaccaagaa ccaggtcagc ctgacctgcc tggtcaaagg cttctatccc | 1140 |
| agcgacatcg ccgtggagtg ggagagcaat gggcagccgg agaacaacta caagaccacg | 1200 |
| cctcccgtgc tggactccga cggctccttc ttcctctaca gcagactcac cgtggacaag | 1260 |
| agcaggtggc agcaggggaa cgtcttctca tgctccgtga tgcatgaggc tctgcacaac | 1320 |
| cactacacgc agaagagcct ctccctgtct ccgggtaaa | 1359 |

<210> SEQ ID NO 30
<211> LENGTH: 657
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 30

| | |
|---|---|
| gacattgtga tgacccagac ccctctgtct ctgcccgtga cacccggcga gcccgcctcc | 60 |
| atcagctgca gtcctcccca gtctctgctg aacagcagaa caagaaagaa ctatctggct | 120 |
| tggtatctgc agaagcccgg ccagtcccct cagctgctga tttactgggc cagcaccaga | 180 |
| gaaagcggcg tgcccgatag attctccggc tccggcagcg gaaccgattt cacactgaag | 240 |
| atctctagag tggaagccga ggacgtgggc gtgtactact gcaagcagac ctacaacttt | 300 |
| cccaccttcg gccaaggcac caagctggag atcaagcgta cggtggctgc accatctgtc | 360 |
| ttcatcttcc cgccatctga tgagcagttg aaatctggaa ctgcctctgt tgtgtgcctg | 420 |
| ctgaataact tctatcccag agaggccaaa gtacagtgga aggtggataa cgccctccaa | 480 |
| tcgggtaact cccaggagag tgtcacagag caggacagca aggacagcac ctacagcctc | 540 |
| agcagcaccc tgacgctgag caaagcagac tacgagaaac acaaagtcta cgcctgcgaa | 600 |
| gtcacccatc agggcctgag ctcgcccgtc acaaagagct tcaacagggg agagtgt | 657 |

<210> SEQ ID NO 31
<211> LENGTH: 451
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Phe
            20                  25                  30

Gly Met His Trp Val Arg Gln Ala Pro Gly Lys Gly Leu Glu Trp Val
        35                  40                  45

Ala Tyr Ile Ser Ile Gly Ser Tyr Thr Val His Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Val Arg Asp Asp Tyr Asp Val Thr Asp Tyr Thr Met Asp Tyr Trp Gly
            100                 105                 110
```

```
Gln Gly Thr Thr Val Thr Val Ser Ser Ala Ser Thr Lys Gly Pro Ser
            115                 120                 125

Val Phe Pro Leu Ala Pro Ser Ser Lys Ser Thr Ser Gly Gly Thr Ala
130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
210                 215                 220

Asp Lys Thr His Thr Cys Pro Pro Cys Pro Ala Pro Glu Ala Ala Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
        275                 280                 285

His Asn Ala Lys Thr Lys Pro Arg Glu Glu Gln Tyr Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Arg Glu Glu Met Thr Lys Asn Gln Val Ser
        355                 360                 365

Leu Thr Cys Leu Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415

Asp Lys Ser Arg Trp Gln Gln Gly Asn Val Phe Ser Cys Ser Val Leu
            420                 425                 430

His Glu Ala Leu His Ser His Tyr Thr Gln Lys Ser Leu Ser Leu Ser
        435                 440                 445

Pro Gly Lys
        450

<210> SEQ ID NO 32
<211> LENGTH: 450
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Glu Val Gln Leu Val Glu Ser Gly Gly Gly Leu Val Gln Pro Gly Gly
1               5                   10                  15
```

-continued

Ser Leu Arg Leu Ser Cys Ala Ala Ser Gly Phe Thr Phe Ser Ser Phe
            20                  25                  30

Gly Met His Trp Val Arg Gln Ala Pro Gly Lys Gly Leu Glu Trp Val
            35                  40                  45

Ala Tyr Ile Ser Ile Gly Ser Tyr Thr Val His Tyr Ala Asp Ser Val
 50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Asp Glu Asp Thr Ala Val Tyr Tyr Cys
             85                  90                  95

Val Arg Asp Asp Tyr Asp Val Thr Asp Tyr Thr Met Asp Tyr Trp Gly
            100                 105                 110

Gln Gly Thr Thr Val Thr Val Ser Ser Ala Ser Thr Lys Gly Pro Ser
            115                 120                 125

Val Phe Pro Leu Ala Pro Ser Ser Lys Ser Thr Ser Gly Gly Thr Ala
130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
                180                 185                 190

Pro Ser Ser Ser Leu Gly Thr Gln Thr Tyr Ile Cys Asn Val Asn His
                195                 200                 205

Lys Pro Ser Asn Thr Lys Val Asp Lys Lys Val Glu Pro Lys Ser Cys
210                 215                 220

Asp Lys Thr His Thr Cys Pro Pro Cys Pro Ala Pro Pro Ala Ala Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
                260                 265                 270

Asp Pro Glu Val Lys Phe Asn Trp Tyr Val Asp Gly Val Glu Val His
                275                 280                 285

Asn Ala Lys Thr Lys Pro Arg Glu Glu Gln Tyr Asn Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
                340                 345                 350

Thr Leu Pro Pro Ser Arg Glu Glu Met Thr Lys Asn Gln Val Ser Leu
                355                 360                 365

Thr Cys Leu Val Lys Gly Phe Tyr Pro Ser Asp Ile Ala Val Glu Trp
            370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Leu His
            420                 425                 430

```
Glu Ala Leu His Ser His Tyr Thr Gln Lys Ser Leu Ser Leu Ser Pro
            435                 440                 445

Gly Lys
    450

<210> SEQ ID NO 33
<211> LENGTH: 6
<212> TYPE: PRT
<213> ORGANISM: Unknown
<220> FEATURE:
<223> OTHER INFORMATION: Description of Unknown:
      IgG1 hinge sequence

<400> SEQUENCE: 33

Asp Lys Thr His Thr Cys
1               5

<210> SEQ ID NO 34
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 34

His His His His His His
1               5
```